(12) United States Patent
Novak

(10) Patent No.: US 10,897,360 B2
(45) Date of Patent: *Jan. 19, 2021

(54) ADDRESSING A TRUSTED EXECUTION ENVIRONMENT USING CLEAN ROOM PROVISIONING

(71) Applicant: Microsoft Technology Licensing, LLC, Redmond, WA (US)

(72) Inventor: Mark F. Novak, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

This patent is subject to a terminal disclaimer.

(21) Appl. No.: 15/417,017

(22) Filed: Jan. 26, 2017

(65) Prior Publication Data

US 2018/0212778 A1 Jul. 26, 2018

(51) Int. Cl.
*H04L 9/32* (2006.01)
*H04L 29/06* (2006.01)
(Continued)

(52) U.S. Cl.
CPC ............ *H04L 9/3234* (2013.01); *G06F 21/53* (2013.01); *G06F 21/74* (2013.01); *H04L 9/0825* (2013.01);
(Continued)

(58) Field of Classification Search
CPC . H04L 9/3234; H04L 63/061; H04L 63/0442; H04L 63/062; H04L 9/0825; H04L 63/0435; G06F 21/53; G06F 21/74
(Continued)

(56) References Cited

U.S. PATENT DOCUMENTS 8,924,727 B2 12/2014 Smith et al.
9,141,769 B1 9/2015 Hitchcock et al.
(Continued)

FOREIGN PATENT DOCUMENTS

CL 2019002026 A1 12/2019
CL 2019002027 A1 12/2019
(Continued)

OTHER PUBLICATIONS

"International Search Report and Written Opinion Issued in PCT Application No. PCT/US2017/067462", dated Feb. 28, 2018, 12 Pages.
(Continued)

*Primary Examiner* — Maung T Lwin
*Assistant Examiner* — Sanchit K Sarker
(74) *Attorney, Agent, or Firm* — Wade IP Law LLC

(57) ABSTRACT

Methods, systems, and devices are described herein for delivering protected data to a trusted execution environment (TrEE) associated with an untrusted requestor. In one aspect, a targeting protocol head, or other intermediary between a requestor and a key management system or other store of protected data may register a public encryption key of a TrEE that corresponds to a private encryption key held by the TrEE or a symmetric key of the TrEE. The targeting protocol head may receive a request for protected data from a requestor associated with the TrEE, and retrieve the protected data for example, from a key management system or store of protected data. The targeting protocol head may generate targeted protected data by encrypting the protected data with the public encryption key or symmetric key of the TrEE. The targeting protocol head may then send the targeted protected data to the requestor.

20 Claims, 14 Drawing Sheets

(51) Int. Cl.
  *G06F 21/74* (2013.01)
  *H04L 9/08* (2006.01)
  *G06F 21/53* (2013.01)
(52) U.S. Cl.
  CPC ...... *H04L 63/0435* (2013.01); *H04L 63/0442* (2013.01); *H04L 63/061* (2013.01); *H04L 63/062* (2013.01)
(58) Field of Classification Search
  USPC .......................................................... 713/171
  See application file for complete search history.

(56) References Cited

U.S. PATENT DOCUMENTS

| | | | |
|---|---|---|---|
| 9,578,664 | B1 | 2/2017 | Paczkowski et al. |
| 9,652,631 | B2 | 5/2017 | Novak et al. |
| 9,781,016 | B1 | 10/2017 | Marquardt et al. |
| 9,866,533 | B2 | 1/2018 | Chazalet et al. |
| 10,127,409 | B1 | 11/2018 | Wade et al. |
| 10,169,574 | B2 | 1/2019 | Nesher et al. |
| 10,277,407 | B2 | 4/2019 | Fenner et al. |
| 10,404,466 | B2 | 9/2019 | Raj et al. |
| 10,412,191 | B1 | 9/2019 | Brandwine et al. |
| 10,484,172 | B2 | 11/2019 | Sykora et al. |
| 10,530,777 | B2 | 1/2020 | Costa |
| 10,601,978 | B2 | 3/2020 | Mosher et al. |
| 10,700,865 | B1 | 6/2020 | Hendrick et al. |
| 10,740,747 | B2 | 8/2020 | Francis |
| 2009/0198997 | A1* | 8/2009 | Yeap .................. H04L 63/0823 713/155 |
| 2011/0154031 | A1 | 6/2011 | Banerjee et al. |
| 2011/0246624 | A1 | 10/2011 | Kato et al. |
| 2012/0239936 | A1 | 9/2012 | Holtmanns et al. |
| 2012/0331550 | A1 | 12/2012 | Raj et al. |
| 2013/0109352 | A1 | 5/2013 | Obaidi |
| 2013/0210389 | A1 | 8/2013 | Obaidi |
| 2013/0281058 | A1 | 10/2013 | Obaidi et al. |
| 2014/0006773 | A1 | 1/2014 | Chazalet et al. |
| 2014/0095876 | A1 | 4/2014 | Smith et al. |
| 2014/0108786 | A1* | 4/2014 | Kreft .................. G06Q 20/3825 713/156 |
| 2014/0108805 | A1 | 4/2014 | Smith et al. |
| 2014/0281531 | A1 | 9/2014 | Phegade et al. |
| 2015/0026790 | A1 | 1/2015 | Scherzer et al. |
| 2015/0134942 | A1 | 5/2015 | Novak et al. |
| 2015/0278531 | A1 | 10/2015 | Smith et al. |
| 2015/0281186 | A1 | 10/2015 | Smith et al. |
| 2015/0282228 | A1 | 10/2015 | Schmidt et al. |
| 2015/0318986 | A1 | 11/2015 | Novak et al. |
| 2015/0319160 | A1 | 11/2015 | Ferguson et al. |
| 2015/0348026 | A1 | 12/2015 | Roberts et al. |
| 2015/0381575 | A1 | 12/2015 | Bhargav-spantzel et al. |
| 2016/0140343 | A1 | 5/2016 | Novak et al. |
| 2016/0182228 | A1* | 6/2016 | Smith ................. H04L 63/1475 713/171 |
| 2016/0254918 | A1 | 9/2016 | Liu et al. |
| 2016/0269374 | A1 | 9/2016 | Smith |
| 2016/0337329 | A1 | 11/2016 | Sood et al. |
| 2017/0005790 | A1* | 1/2017 | Brockmann .......... H04L 9/0822 |
| 2017/0213218 | A1 | 7/2017 | Pickering et al. |
| 2017/0289197 | A1 | 10/2017 | Mandyam et al. |
| 2017/0302459 | A1 | 10/2017 | Fenner et al. |
| 2017/0317990 | A1 | 11/2017 | Kim et al. |
| 2017/0317996 | A1 | 11/2017 | Poornachandran et al. |
| 2018/0025343 | A1 | 1/2018 | Quentin et al. |
| 2018/0101677 | A1 | 4/2018 | Broumas et al. |
| 2018/0152454 | A1 | 5/2018 | Kwon et al. |
| 2018/0212769 | A1 | 7/2018 | Novak |
| 2018/0212932 | A1 | 7/2018 | Novak |
| 2018/0212940 | A1 | 7/2018 | Novak |
| 2018/0367317 | A1 | 12/2018 | Forler et al. |
| 2019/0005229 | A1 | 1/2019 | Hlaing et al. |
| 2019/0026452 | A1 | 1/2019 | Wang et al. |
| 2019/0087586 | A1 | 3/2019 | Mckeen et al. |
| 2019/0158291 | A1 | 5/2019 | Ignatchenko |
| 2019/0172047 | A1 | 6/2019 | Tan et al. |
| 2019/0311362 | A1 | 10/2019 | Taveau et al. |

FOREIGN PATENT DOCUMENTS

| | | | | |
|---|---|---|---|---|
| EP | 2887607 | * | 6/2015 | ............. H04L 29/06 |
| EP | 2887607 | A1 | 6/2015 | |
| WO | 2015026336 | A1 | 2/2015 | |
| WO | 2015094326 | A1 | 6/2015 | |

OTHER PUBLICATIONS

Sabt, "Trusted Execution Environment: What It Is, and What It Is Not", Published in IEEE Trustcom/BigDataSE/ISPA, vol. 1, Aug. 20, 2015, pp. 57-64.
"Final Office Action Issued in U.S. Appl. No. 15/416,981", dated Mar. 21, 2019, 23 Pages.
"Non Final Office Action Issued in U.S. Appl. No. 15/416,981", dated Aug. 30, 2019, 19 Pages.
"Non Final Office Action Issued in U.S. Appl. No. 15/416,981", dated Sep. 28, 2018, 22 Pages.
"Final Office Action Issued in U.S. Appl. No. 15/416,981", dated Mar. 3, 2020, 22 Pages.
"International Search Report and Written Opinion Issued in PCT Application No. PCT/US2017/067459", dated Apr. 4, 2018, 14 Pages.
"Final Office Action Issued in U.S. Appl. No. 15/417,060", dated Feb. 8, 2019, 22 Pages.
Santos, et al., "Trusted Language Runtime (TRL): Enabling Trusted Applications on Smartphones", In Proceedings of the 12th Workshop on Mobile Computing Systems and Applications, Mar. 1, 2011, pp. 21-26.
"Non Final Office Action Issued in U.S. Appl. No. 15/417,060", dated Sep. 26, 2018, 17 Pages.
"Non Final Office Action Issued in U.S. Appl. No. 15/417,060", dated Aug. 19, 2019, 24 Pages.
"Notice of Allowance Issued in U.S. Appl. No. 15/417,060", dated Mar. 18, 2020, 15 Pages.
Dwoskin, et al., "Hardware-rooted Trust for Secure Key Management and Transient Trust", In Proceedings of the 14th ACM conference on Computer and communications security, Oct. 29, 2007, pp. 389-400.
Ekberg, et al., "The Untapped Potential of Trusted Execution Environments on Mobile Devices", In Journal of IEEE Security & Privacy vol. 12, Issue 4, Jul. 2014, pp. 29-37.
Liu, et al., "VeriUI: Attested Login for Mobile Devices", In Proceedings of the 15th Workshop on Mobile Computing Systems and Applications, Feb. 26, 2014, 6 Pages.
Noubir, et al., "Trusted Code Execution on Untrusted Platforms Using Intel SGX", In Proceedings of Virus Bulletin Conference, Oct. 6, 2016, 7 Pages.
"International Search Report and Written Opinion Issued in PCT Application No. PCT/US2017/067460", dated Mar. 15, 2018, 11 Pages.
"Non Final Office Action Issued in U.S. Appl. No. 15/417,042", dated Dec. 26, 2018, 10 Pages.
"International Search Report and Written Opinion Issued in PCT Application No. PCT/US2017/067461", dated Mar. 1, 2018, 12 Pages.
"Notice of Allowance Issued in U.S. Appl. No. 15/417,060", dated Sep. 17, 2020, 9 Pages.
"Office Action and Search Report Issued in Chile Patent Application No. 201902026", dated Oct. 14, 2020, 12 Pages.
"Office Action and Search Report Issued in Chile Patent Application No. 201902027", dated Oct. 14, 2020, 13 Pages.
"Notice of Allowance Issued in U.S. Appl. No. 15/416,981", dated Nov. 18, 2020, 23 Pages.

* cited by examiner

ADDRESSING A TRUSTED EXECUTION ENVIRONMENT USING CLEAN ROOM PROVISIONING

TECHNICAL FIELD

This disclosure relates generally to trusted and/or isolated execution environments in computing devices, and more specifically to secure delivery of one or more secrets or keys into a trusted execution environment.

BACKGROUND

A key management system (KMS) is a store of secrets. A secret typically has a public ID, a guarded value and a policy controlling who can obtain the value. In some cases, the secret may also have an expiration date and other metadata, and so on. In a typical use case, a requestor authenticates to a KMS, establishes a secure channel, requests the secret value by providing the secret ID, and expects the KMS to return to it the plaintext secret value. The value is protected from unauthorized eavesdropping and tampering by the secure channel between the requestor and the KMS.

A Trusted Execution Environment (TrEE), as used herein, can include any one of: a virtual secure mode (VSM) trustlet, an SGX application, an ARM TrustZone application or some other similar vehicle. There are some unique properties that TrEEs generally have in common. A TrEE will generally have a full crypto stack (in other words, one can assume a wide variety of cryptographic primitives across the entire spectrum, from secure random number generation to a full menu of hashing, encryption and signing libraries using secret keys). A TrEE will also generally have or be associated with few or limited I/O facilities, typically limited to a request driven architecture where requests are initiated by the untrusted "outside world". For example, a VSM trustlet may use unauthenticated Remote Procedure Calls (RPCs). TrEEs may also have access to key material or data that is unavailable outside of TrEE. This allows a TrEE, among other things, to store data using untrusted I/O and then read it back, assuring tamper-resistance and confidentiality of state. A TrEE will also generally have or be associated with attestable code, configuration and key material. In particular, attestable key material allows the TrEE to receive messages encrypted to it from 3rd parties and sign messages to 3rd parties as coming from the TrEE.

As with other applications, the use of a KMS with a TrEE may present security limitations. Accordingly, improvements can be made to improve security utilizing keys sourced from a KMS with or in TrEEs.

SUMMARY

Illustrative examples of the disclosure include, without limitation, methods, systems, and various devices. In one aspect, a method for delivering protected data to a trusted execution environment (TrEE) associated with an untrusted requestor may be performed at least in part by a targeting protocol head, or other intermediary between a requestor and a key management system or other store of protected data. In one example, the targeting protocol head may register a public encryption key of a TrEE that corresponds to a private encryption key held by the TrEE. In another example, the targeting protocol head may register a symmetric key of the TrEE. The targeting protocol head may receive a request for protected data from a requestor associated with the TrEE, and retrieve the protected data for example, from a key management system or store of protected data. The targeting protocol head may generate targeted protected data by encrypting the protected data with the public encryption key of the TrEE or the symmetric key. The targeting protocol head may then send the targeted protected data to the requestor.

Other features of the systems and methods are described below. The features, functions, and advantages can be achieved independently in various examples or may be combined in yet other examples, further details of which can be seen with reference to the following description and drawings.

BRIEF DESCRIPTION OF THE DRAWINGS

Embodiments of the present disclosure will be described more fully hereinafter with reference to the accompanying drawings, in which.

DETAILED DESCRIPTION OF ILLUSTRATIVE EMBODIMENTS

Systems and techniques are described herein for securely delivering at least one key (e.g., a signing key or an encryption key) or protected data/secret into a trusted execution environment (TrEE) of a computing device, such as one or more physical or virtual computing devices. In one aspect, an intermediary may be implemented between a key requestor and a key management system or entity that possesses protected data. The intermediary may be referred to herein as a targeting protocol head. The key requestor may be associated with the secure execution environment or TrEE, which may include one or more of a VSM trustlet, an SGX application, an ARM TrustZone application, or some other similar vehicle. The TrEE may be isolated from the requestor. The requestor may request one or more secrets to deliver to the TrEE or a specific trustlet executing within the TrEE from the targeting protocol head. The targeting protocol head may, responsive to the request, communicate with a key management system or other entity that holds secrets to obtain one or more secrets for delivery to the TrEE. The targeting protocol head may specifically target the protected data at the TrEE so that the protected data is not accessible by the requestor or an attacker.

In some aspects, the implementation of a targeting protocol head may negate the need for a secure channel between the requestor and the key management system. The targeting protocol head, using the TrEE targeting techniques described herein, may also make it possible to send one or more secrets or data to a TrEE or a nested TrEE (e.g., a trustlet running on top of a secure kernel), in such a way that the secrets/data are not accessible by the requestor. In some cases, the requestor may be untrusted or potentially untrusted, such that an owner of the protected data may wish to keep the protected data inaccessible by the requestor, for any of a variety of reasons. In some cases, it may be difficult or cumbersome to establish that the requestor is trustworthy, or to ensure that the requestor remains trustworthy. Many of these concerns may be negated by assuming the requestor is not trusted, and isolating the TrEE from the requestor. This isolation may greatly improve security against different types of attacks and may provide other benefits and advantages, as will be described in greater detail below.

Figure 1A:
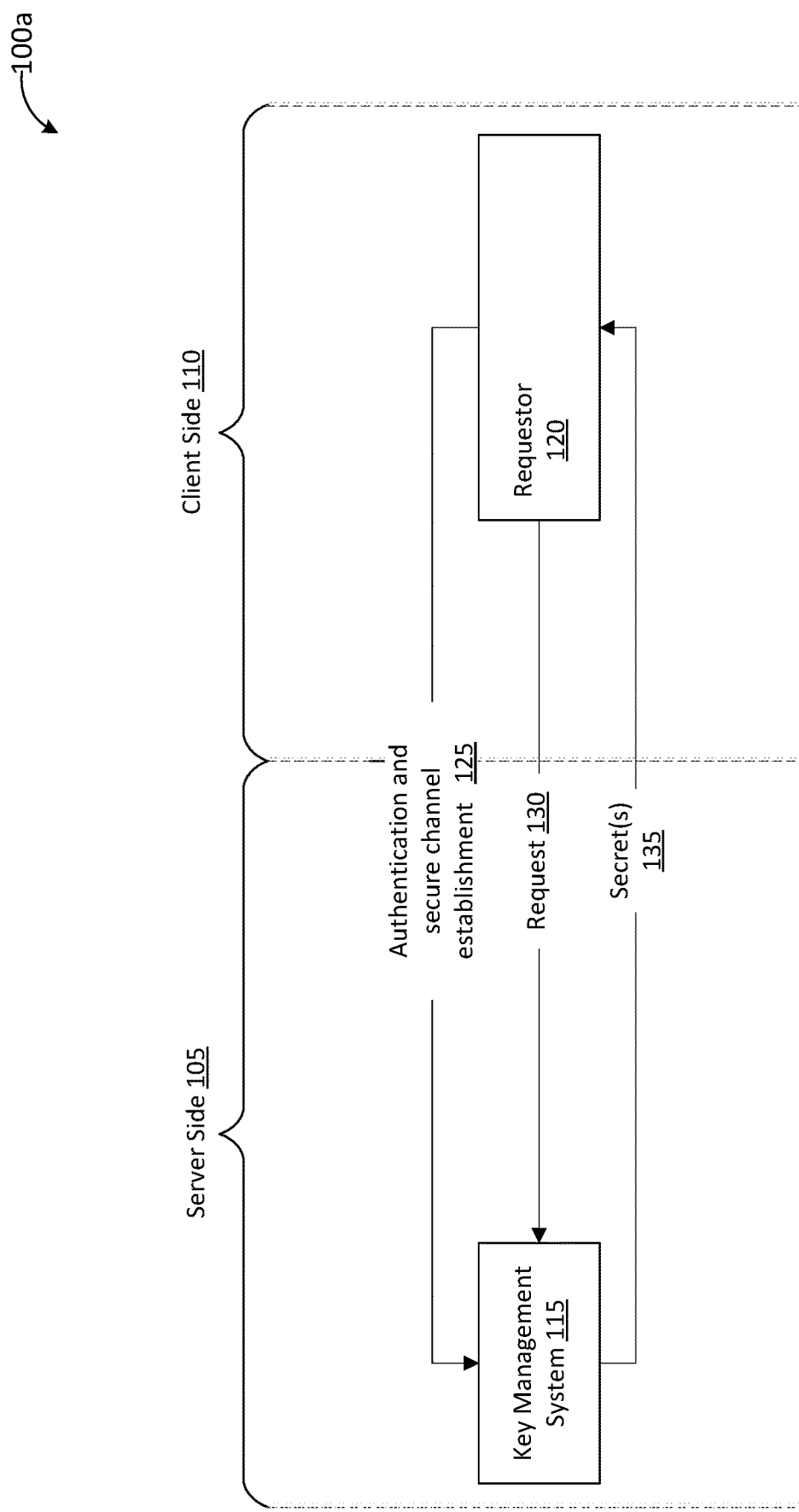
FIGS. 1A, 1B, and 1C depict three examples of a system and process for exchanging keys between a requestor and a key management system.

FIG. 1A illustrates an example system and process 100a for exchanging keys between a requestor and a key management system. As illustrated, a requestor or requesting device 120, associated with a client device or client side 110, may communicate with a key management system or holder of some desired secret(s) 115, associated with a server or server side 105. The requestor 120 may request one or more secrets or pieces of protected data from the key management system 115, for example, to access certain protected data, execute one or more protected processes, and the like. The requestor 120 and key management system (KMS) 115 may utilize a public key-private key security system, or other key protocol, as are known in the art, to exchange the desired secrets/data.

The requestor 120 may first authenticate with the KMS 115 and establish a secure communication channel, at operation 125, via any of known techniques in the art. Operation 125 may include utilizing a public key system or the like. Next, utilizing the secure channel established via operation 125, the requestor 120 may send a request for one or more secrets/protected data, at operation 130, to the KMS 115. Upon verifying the request, the KMS 115 may transmit the secret or requested data back to the requestor 120, at operation 135, over the secure communication channel. As is standard in the art, the secret/requested data may be transmitted at 135 over the secure channel, without any additional protection above the secure channel. As a result, the secret/data that is transmitted at operation 135 may be exposed to the requesting device 120.

Figure 1B:
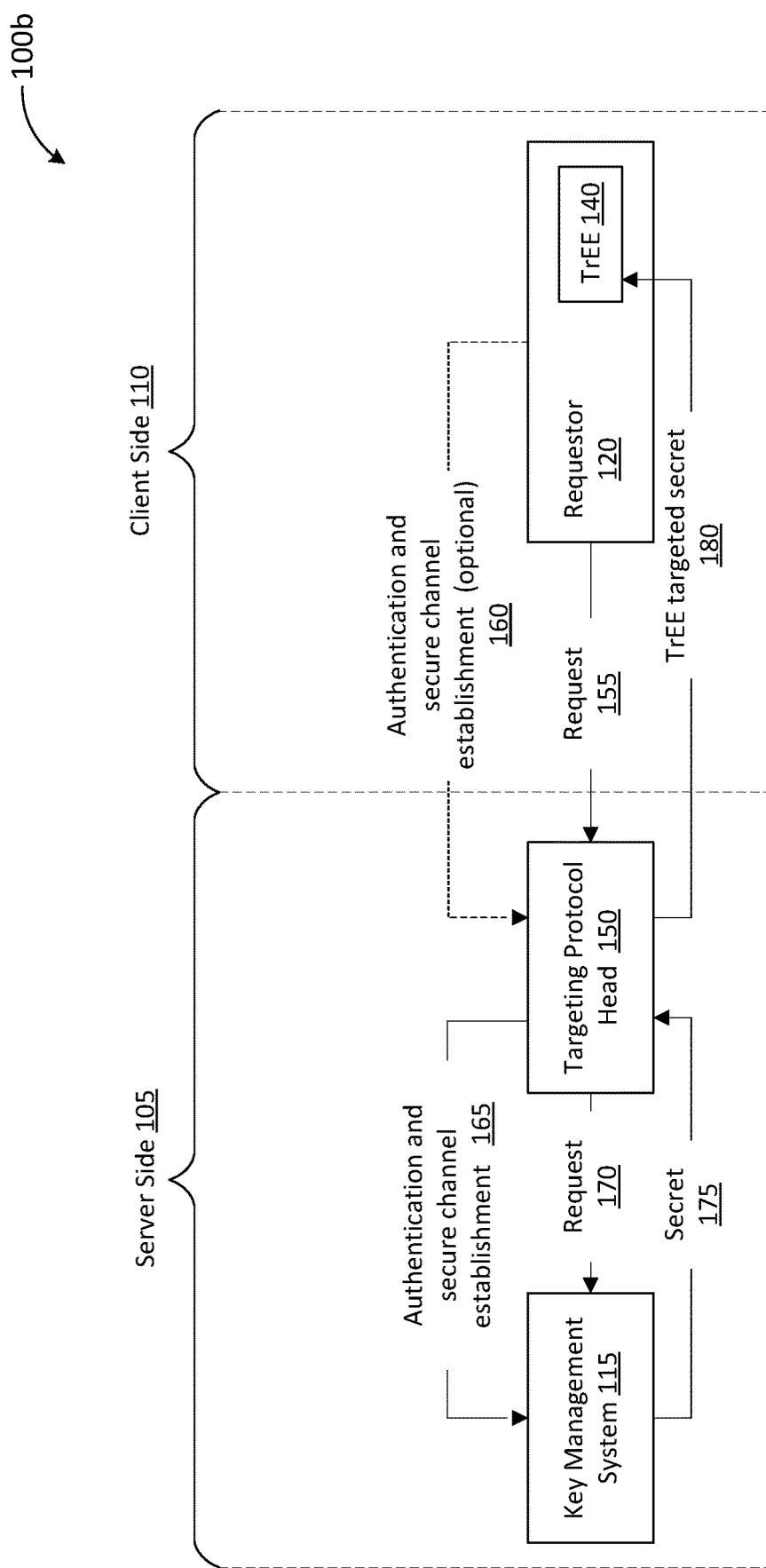
Figure 2:
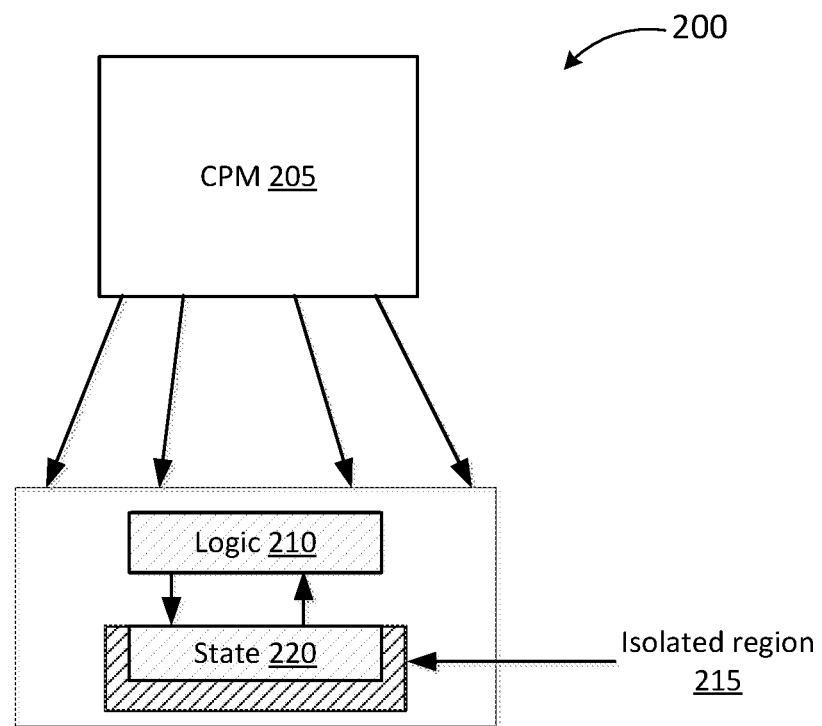
FIG. 2 depicts an example diagram of a control program monitor implementing an isolated region or trusted execution environment (TrEE).

FIG. 1B illustrates an example system and process 100b, for more securely exchanging one or more secrets or protected data between a requestor 120 and a KMS 115, on behalf of a trusted execution environment (TrEE) 140, enclave, or other term used to indicate an isolated execution environment associated with the requestor 120. The TrEE 140 may be isolated from the requestor 120, such that code and/or data contained in the TrEE 140 may not be accessible (e.g., readable and/or writeable to) by the requestor 120. FIG. 2 illustrates an example 200 of a trusted execution environment in which a computing device 205 may include logic 210 (e.g., code), and state information 220, such as data. The state information 220 may be stored or located in an isolated region 215, such as may be secure from unauthorized access. In some cases, data 220 inside the isolated region 215 cannot be directly read or written by any entity other than the logic 210 associated with the isolated region 215. The isolated logic 210 decides what types of access it will allow to what types or portions of data 220. In one example, logic 210 may allow incrementing and reading a value associated with data 220, but not otherwise modifying data 220. In another example, logic 210 may allow cryptographic operations using a key without ever granting access to the value of the key itself. In the example illustrated, the logic or code 210 may be in a general or accessible region of the CPM 205; however, it should be appreciated, that in some instances, the logic 210 may also be located within the same or a different isolated region as state information 220.

Returning to system 100b, a targeting protocol head (TPH) 150 may be implemented on the server side 105 to serve as an intermediary between the requestor 120/TrEE 140, and the KMS 115. Protocol head may refer to a software implementation of a protocol handler, typically fronting a system that does not natively speak a specific protocol. Targeting may refer to cryptographic targeting of the execution environment. Taken together, the term may indicate software and/or hardware that implements a protocol for retrieving secrets that targets the responses at a TrEE. In some aspects, the targeting protocol head 150 may be implemented as a virtual or cloud resource, for example, which may be running on different hardware, software, and/or separate from the KMS 115. In some aspects, an entity such as a datacenter, may host and/or provide the targeting protocol head 150 as a service, for example. The targeting protocol head 150 may perform two primary functions: 1) communicate with the KMS 115/obtain secret or protected data from an external entity, and 2) target responses to the TrEE 140 of the requestor 120. As a result of the use of targeting protocol head 150, the requestor 120 need not authenticate to the KMS 115 directly. The KMS 115 yields its secrets to the targeting protocol head 150, and not to the requestor 120. The function of the targeting protocol head 150 is to target responses to the TrEE 140 of the requestor 120, thus ensuring that the requestor 120 cannot obtain the plaintext of the secret/protected data. The targeting protocol head 150 may instead authenticate to the KMS 115 on the requestor's 120 behalf, but may do so with or without using the requestor's 120 identity. In some cases, the targeting protocol head 150 may need to be convinced that the secret it is going to return to the TrEE 140 of requestor 120 is going to be in "safe hands." In this instance, the requestor 120 may provide attestable information to the targeting protocol head 150 about the state of the TrEE 140, which may include attestable key material associated with the TrEE 140, to which responses can be encrypted.

In some cases, multiple different processes, such as provided by one or more trustlets, may operate concurrently within a secure kernel, where each trustlet and the secure kernel are each considered a TrEE 140 (e.g. this is an example of a nested TrEE). In this scenario each different trustlet may be associated with a session ID, trustlet type, and/or other ID, which may be used to identify the individual trustlet within the secure kernel (e.g., both represented as TrEE 140). The response from the targeting protocol head 150 may be narrowly targeted at the particular trustlet within the TrEE 140 identified in the request, as will be described in greater detail below.

In the case of TrEE 140 targeting, there is no inherent need for a secure channel between the requestor 120 and the targeting protocol head 150, since the requestor 120 itself is not trusted with the response. However, it should be appreciated that a secure channel between the requestor 120 and the targeting protocol head 150 may be added via authentication operation 160, for example, to protect access to the request itself (which secret the requestor wants), which could lead to undesirable information disclosure. After or in place of authentication at operation 160, the requestor 120, on behalf of the TrEE 140, may send a request for one or more secrets or secret or protected data to the targeting protocol head 150, for example, to deliver to the TrEE 140, at operation 155. In some aspects, the request may be associated with or identify the TrEE 140. The targeting protocol head 150 may determine if the TrEE 140 is trustworthy. In one aspect, authentication of the requestor 120 may rely on a type of clean room provisioning. In another aspect, authentication may rely upon attestation.

Clean room provisioning may be used when the requestor 120 device is, for example, brand new and reasonably assumed to be free from malicious software. An example process for delivering protected data to a TrEE associated with a requestor using clean room provisioning will be described in greater detail below in reference to FIG. 3. An example process for delivering protected data to a TrEE associated with a requestor using attestation (e.g., an attestation service) will be described in greater detail below in reference to FIG. 4.

In either case, once the TPH 150 has authenticated the requestor 120, and/or established trustworthiness of the TrEE 140, the TPH 150 may authenticate and establish a secure communication channel at operation 165 with the KMS 115. In some aspects the KMS 115 may include or be associated with any entity that holds one or more secrets or protected data, such as licenses, permissions, passwords, and so on. Upon establishing a secure communication channel with KMS 115, the TPH 150 may send a request for protected data at operation 170. The KMS 115 may return the requested secret at operation 175. The TPH 150 may target the secret(s) or protected data at the TrEE 140 and send the one or more secrets at operation 180.

In some aspects, delivering the protected data to the TrEE 140 at operation 180 may utilize at least one of the following data structures: an encryption identity key, which may be built around the TrEE identity or attestation process or attestation log, or in the nested TrEE example (e.g., a trustlet running on top of a secure kernel), a signing identity key, which may also be built around the attestation process, as will be described in greater detail below.

Figure 1C:
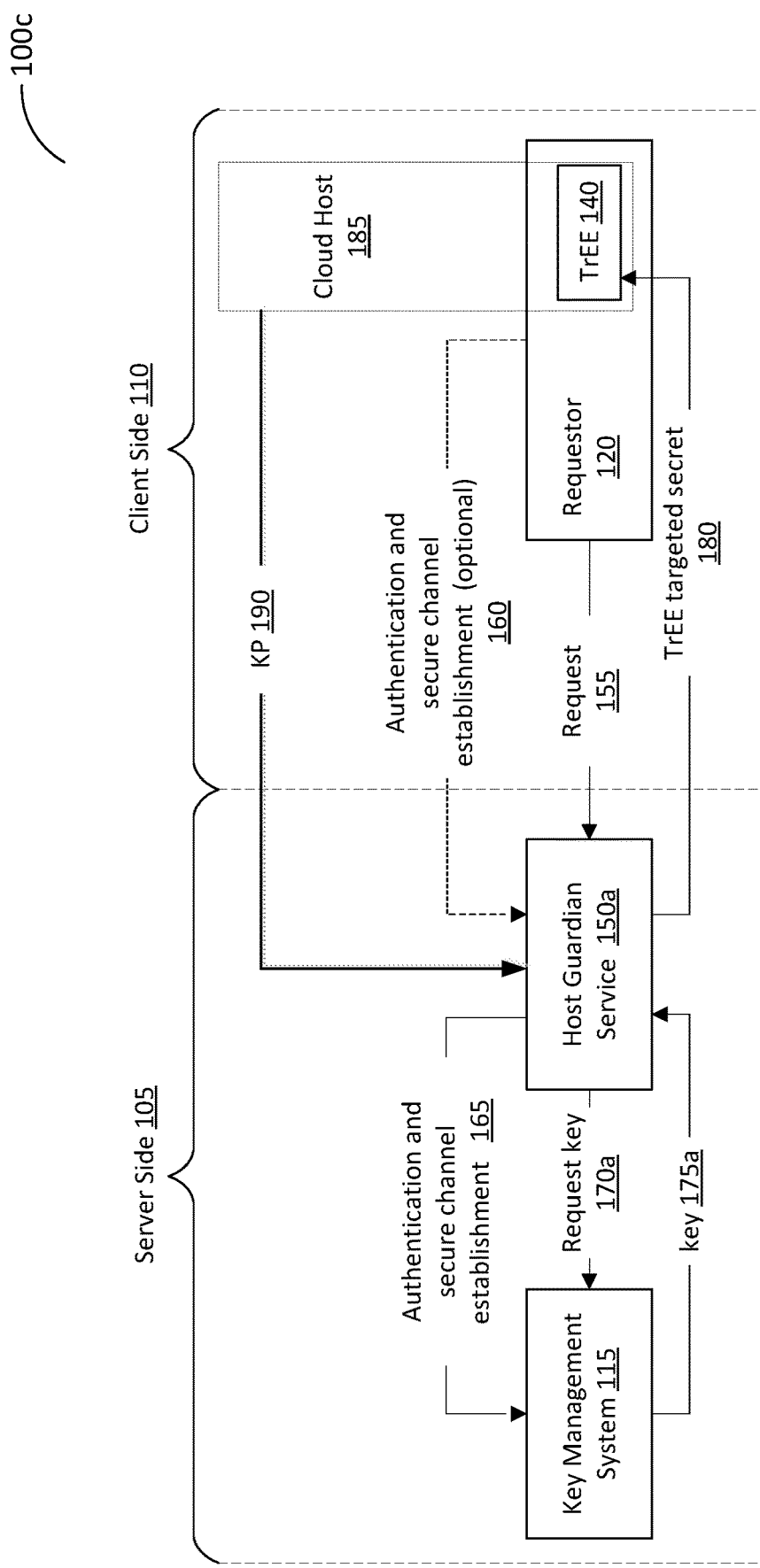

FIG. 1C illustrates another example system and process 100c, for securely exchanging one or more secrets or protected data between a requestor 120 and a KMS 115, on behalf of a trusted execution environment (TrEE) 140. System 100c may be a specific example of system 100b described above. In system 100c, the targeting protocol head 150 may be a Host Guardian Service (HGS) 150a. In system 100c, the HGS 150a may receive a key protector 190, for example, from a cloud host 185 or other entity that may instantiate or otherwise control the TrEE 140. In system 100c, the requestor 120 may be associated with a virtual machine, for example, provided by cloud host 185. The KP 190 may incorporate one or more aspects of the key protector described in related U.S. patent application Ser. No. 14/481,399 titled "Secure Transport of Encrypted Virtual Machines with Continuous Owner Access," filed Sep. 9, 2014, the contents of which are herein incorporated by reference in its entirety. The KP 190 may contain one or more secrets usable by the TrEE 140, such as a transport key. The KP 190 may in essence wrap the transport key so that it is accessible only by a set of guardians, which are authorized to access the transport key. The KP 190 may be encrypted such that in order to read the contents of the KP 190, and retrieve the transport key, the HGS 150a may request a decryption key from KMS 115, at operation 170a, after authenticating and establishing a secure commination channel with KMS 115 at operation 165. The KMS 115, in response, may send the decryption key to the HGS at operation 175a. The HGS 150a may then use the decryption key to decrypt the KP 190, and retrieve the one or more secrets (e.g., transport key), to send to the TrEE 140. The HGS 150a may then send the secrets or transport key to the TrEE at operation 180, via one or more addressing techniques that will be described in greater detail below. In some aspects, the TrEE 140 may be addressed based on data from the KP 190.

It should be appreciated that in some cases, the HGS 150a and the KMS 115 may be one entity, such that no communication channel needs to be established between them and no authentication is needed.

In system 100c, no authentication between the requestor 120 and the HGS 150a is needed. As long as the cloud or fabric host 180 is healthy, it does not matter which fabric host is communicating with HGS 150a, so long as it is one of the servers in the fabric (this may be verified via attestation).

Figure 3:
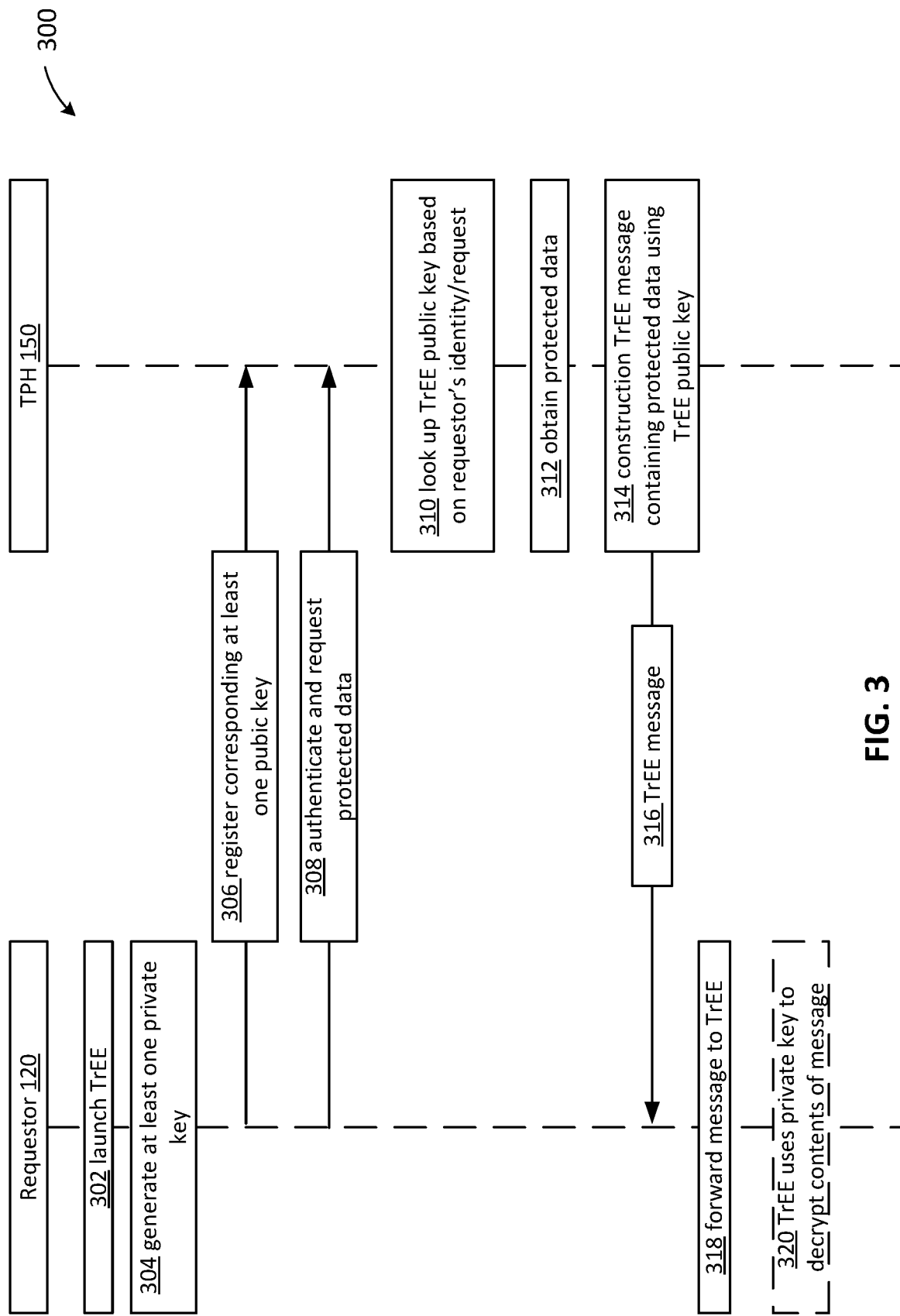
FIG. 3 depicts an example process for delivering protected data to a trusted TrEE utilizing an intermediary targeting protocol head.

FIG. 3 illustrates an example process 300 for delivering protected data to a TrEE of a requestor, where the requestor is assumed to be trustworthy (e.g., free from malicious software). As used herein, dashed lines of a box or operation in any figure indicate that the operation is optional, such that it may be excluded. Process 300 may utilize an encryption key associated with the TrEE, such as the public key of a public key private key pair (e.g., an asymmetric key pair) generated by the TrEE or a secure kernel of the requestor that initiates the TrEE. In other cases, the encryption key may be symmetric. In this scenario, the key of the TrEE may be carefully safeguarded by the TPH 150 against unauthorized disclosure. As used herein, a secure kernel may refer to any portion of a computing device that is associated with higher level of security, as is known in the art.

In this scenario, a TrEE 140 may be launched or initiated at operation 302, and one or more private keys (e.g., private encryption keys) and corresponding public keys may be generated inside the TrEE 140, at operation 304. The corresponding public key may then be registered with the TPH 150 and associated with the requestor's and/or requesting device's identity, at operation 306. In some cases, the public key of the TrEE 140 needs to be registered only once, such that after the public key is registered, process 300 may begin at operation 308. Subsequently, the requestor 120 may authenticate at operation 308 with the TPH 150, via any known authentication technique. The TPH 150 can then look up the public key to use in delivering the response to the TrEE 140, for example, based on the registered public key of the TrEE 140, which may be associated with an identity of the requestor 120. This process may be referred to as "clean room" provisioning because it can only be done securely when the requestor 120 is in a known-good or trustworthy state. In this example, there is no need for a certificate based authentication where the requestor 120 sends a TrEE Health Certificate (THC) to the TPH 150, because the requestor 120 is trustworthy. In the absence of ubiquitous attestation services, this is a viable option to validate that the correct TrEE 140 is being targeted by the TPH 150.

Next, the TPH 150 may obtain protected data for delivery to the TrEE 140, for example from a KMS 115, as described above, at operation 312. Using the TrEE public key accessed via operation 310, the TPH 150 may then construct a message to send to the TrEE 140, including the obtained protected data, at operation 314. The TPH 150 may send the message to the requestor 120 at operation 316.

Upon receiving the message, the requestor 120 may forward it to the TrEE 140, at operation 318. Because the requestor 120 does not have access to the TrEE's private key, the requestor 120 cannot decrypt the message to access the protected data. The TrEE 140 may use its private key to decrypt the message and access the protected data, at operation 320.

Figure 4A:
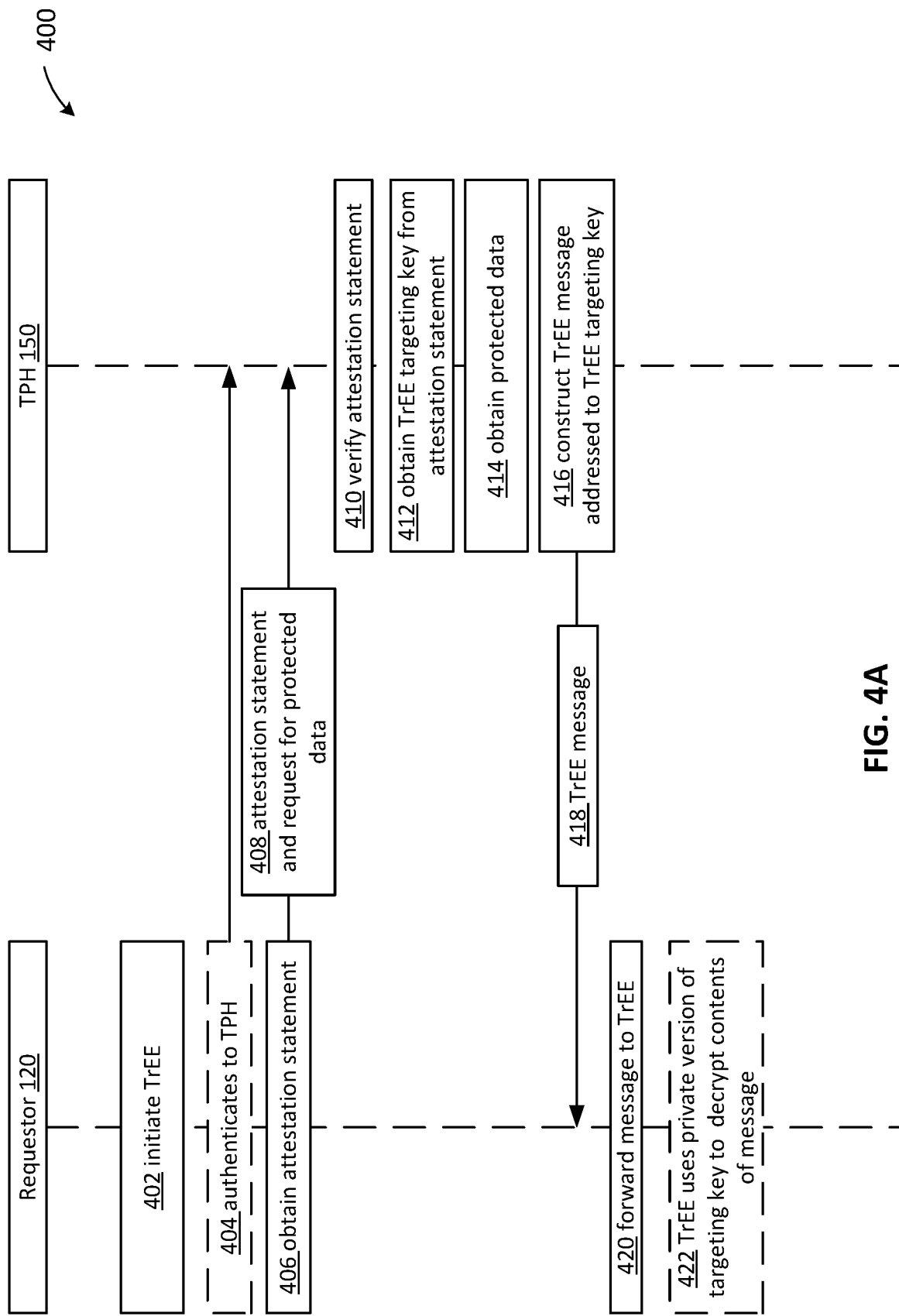
FIGS. 4A and 4B depict another example process for delivering protected data to a TrEE utilizing an intermediary targeting protocol head.

FIG. 4A illustrates an example process 400 for delivering protected data to a TrEE of an untrusted requestor. Process 400 may utilize an encryption key associated with the TrEE, such as the public key of a public key private key pair generated by the TrEE or a secure kernel of the requestor that initiates the TrEE, such as in the case of a nested TrEE, which may be referred to herein as a trustlet. Process 400 may additionally or alternatively utilize a signing key of the secure kernel, which may be considered the outer TrEE, with the trustlet nested or running on top of the secure kernel, associated with the TrEE, which may be used to certify the public key of the key pair generated by the TrEE, as will be described in greater detail below.

Figure 4B:
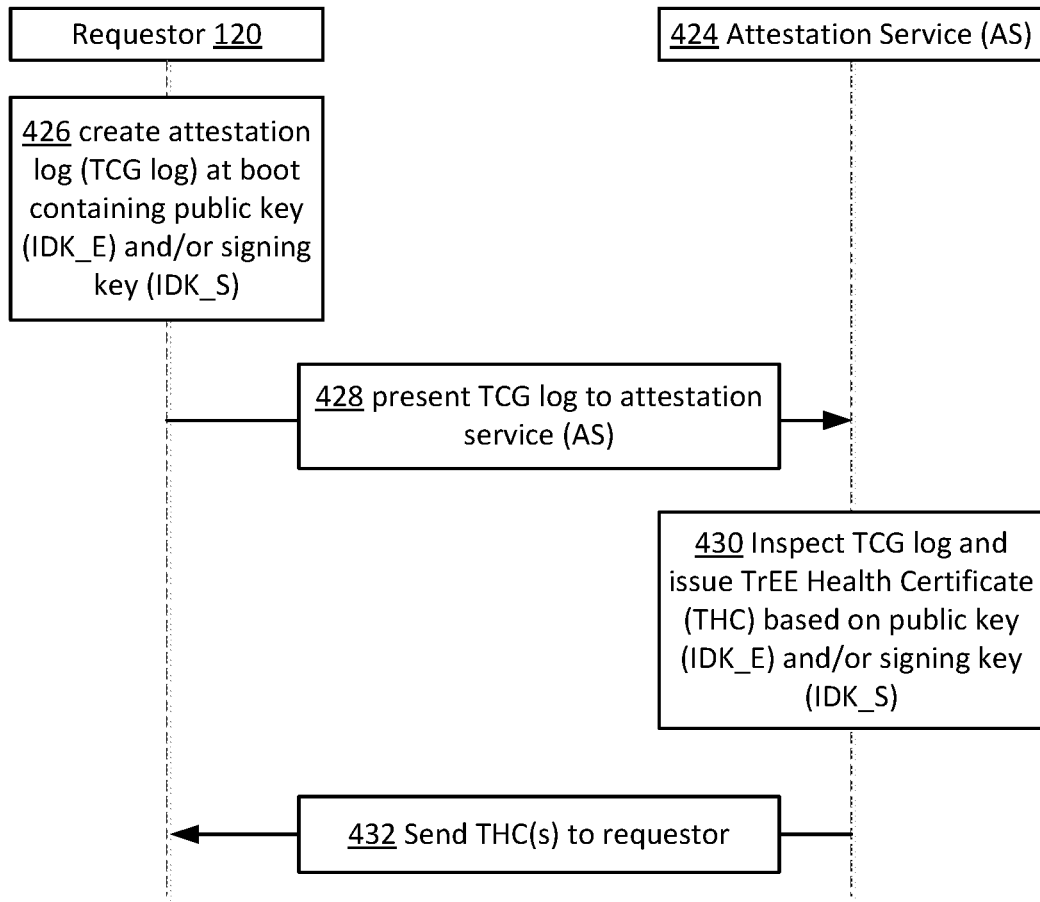

According to process 400, after initialization of a TrEE at operation 402, the requestor 120 may request an attestation report or statement from an attestation service, at operation 406. FIG. 4B illustrates an example process for obtaining an attestation statement or report from an attestations service 424. In the example of FIG. 4B, the requestor 120 may create an attestation log (TCG log) at boot containing a public key (IDK_E) of the TrEE 140 (trustlet) or a signing key (IDK_S) of the TrEE (secure kernel), at operation 426. The requestor 120 may then present the TCG log to an attestation service 424, at operation 428. In some cases, the TPH 150 may direct, or the requestor 120 may choose, an attestation service that is trusted by the TPH 150. The attestation service 424 may inspect the TCG log and issue a TrEE Health Certificate (THC) based on the encryption key (IDK_E) and/or signing key (IDK_S) of the TrEE 140 (secure kernel), at operation 430. The attestation service 242 may then send the THC (also referred to herein as an attestation statement) back to the requestor 120 at operation 432.

Upon obtaining the attestation statement at operation 406, the requestor 120 may send the attestation statement and a request for protected data to the TPH 150, on behalf of the TrEE 140, at operation 408. The THC or attestation statement may contain the subject name of the requestor 120 (to create binding between requestor's identity established during authentication and the certificate), and the key that the responder (TPH 150) should use in formulating the response (e.g., an encryption key or signing key).

In some aspects, a tamper-proof identity, such as a trusted platform module's (TPM) encryption key (EK) is associated with the requestor 120. Attestation of the requestor 120 may be performed using the TPM EK, as known in the art.

In some aspects, either out of band, or through an issuance policy (IP) object identifier (OID), which may be part of the THC, the TrEE via the requestor 120 may communicate to the TPH 150 whether the key is an encryption key or a signing key. The choice between which key is used may affect the choice of mechanism used to structure the response, as described above. Critically, proof of possession of the private key backing the certificate is not required by the TPH 150, simply because if the wrong certificate is given, the requestor 120 won't be able to make sense of the response anyways, since it does not have access to the corresponding private key.

Figure 5A:
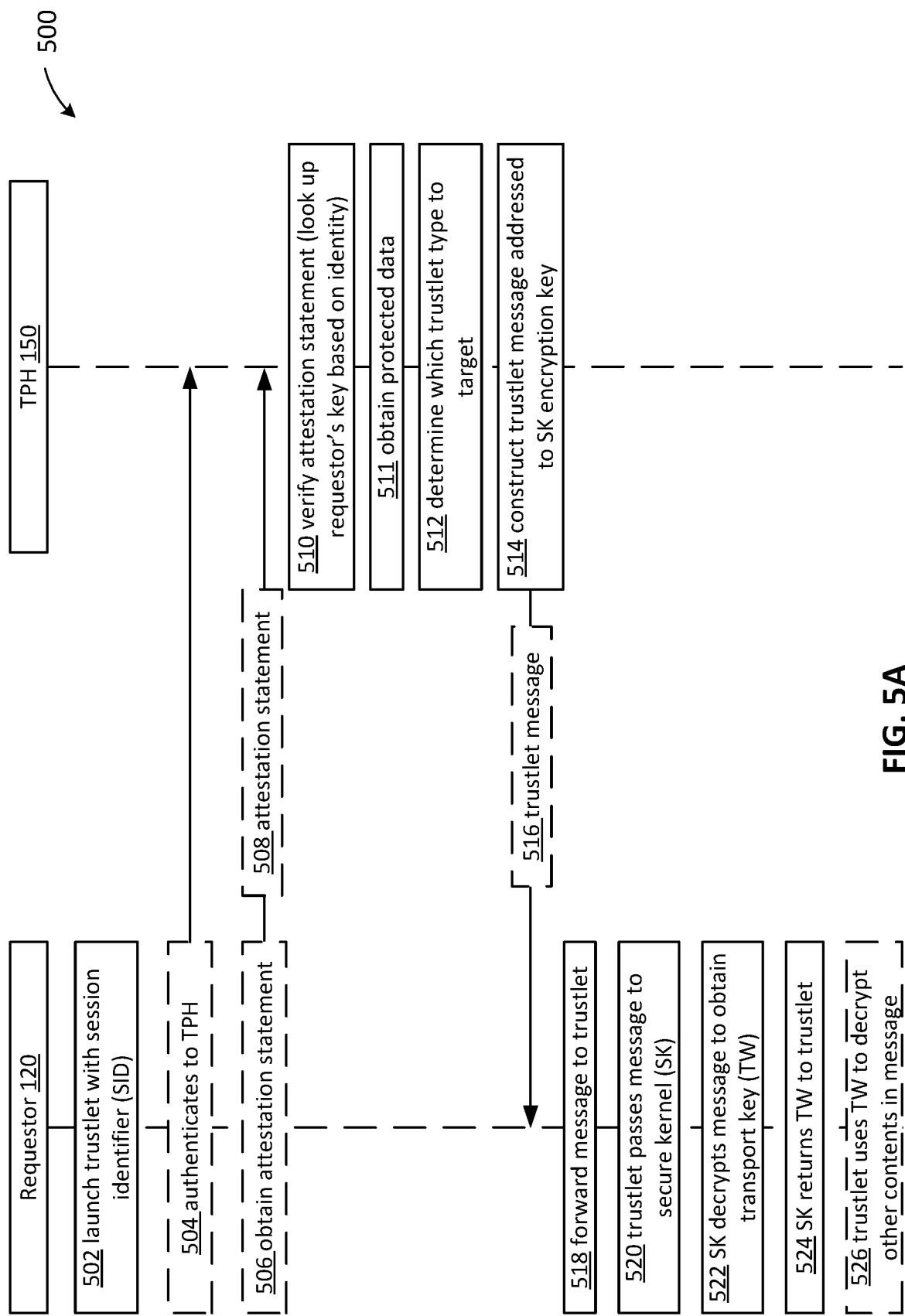
FIGS. 5A and 5B depict an example process for delivering protected data to a nested TrEE utilizing an intermediary targeting protocol head.
Figure 5C:
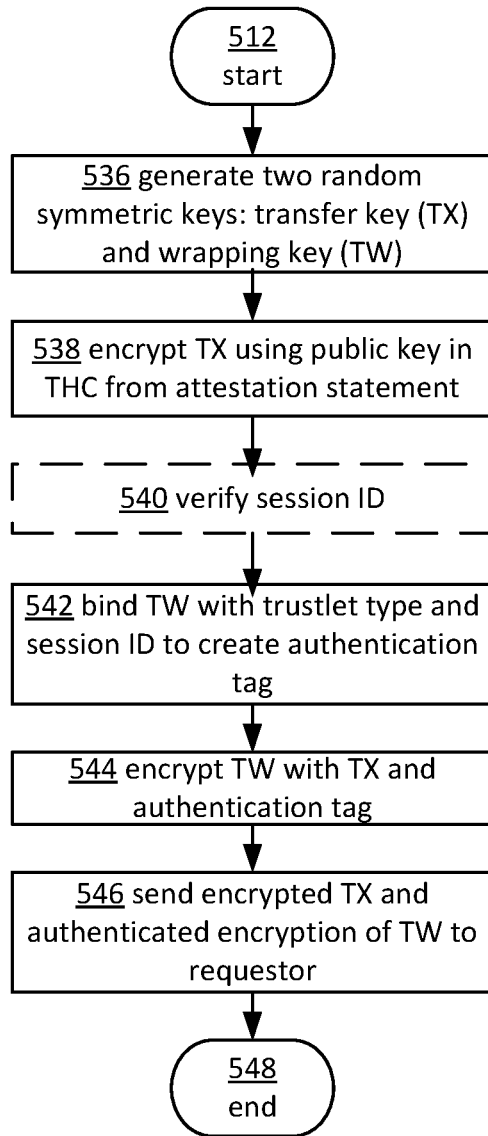

FIGS. 5A and 5B illustrate an example process 500 for delivering protected data to a nested TrEE of an untrusted requestor. In some aspects, two or more TrEE's may be nested, such that one TrEE is contained within another TrEE. As referred to herein, a trustlet is the nested TrEE, which is contained in an outer TrEE. In one example, the outer TrEE may include a secure kernel of a trusted portion of an operating system, such as a specific partition of memory associated with a virtual trust level, as will be described in greater detail below in reference to FIG. 6. Process 500 may be utilized when for example, only the encryption key of the outer TrEE, which in some cases may be the secure kernel of the machine instantiating the trustlet, is available.

Process 500 may begin at operation 502, in which the requestor 120 launches the trustlet with a "session identifier" that is decided by the requestor 120, which may include any type of identifier, such as related to or identifying what content or data the trustlet will operate on, relating to a user of the trustlet, etc. (e.g. "streaming content application trustlet for playing 'specific title'"). In one example, the session ID may be a 32-byte value. The value may be preserved, read-only for the duration of the trustlet's lifetime and available to the secure kernel when receiving a targeted message to the trustlet. The value could be missing (not specified at process launch), in which case the session ID can be assumed to be zero.

Next, at operation 504, the requestor 120 may authenticate to the TPH 150 (optional as described above, but only in very limited circumstances, such as where there really is no difference between requestors). One example where binding between the TrEE (e.g., the TrEE's key) and the requestor's identity is desired, for instance, is when the playing of a content item, such as movie, is restricted by license or subscriber validation (e.g., a NetFlix user wants to get a license to play a movie but NetFlix wants to make sure that it is that subscriber that is receiving the movie license (inside their TrEE)).

The requestor 120 may obtain an attestation statement, such as according to process 406 described above in reference to FIG. 4B, from an attestation service trusted by the TPH 150, at operation 506. Next, the requestor 120 may present to the TPH 150 the attestation statement, at operation 508. It should be appreciated that in the clean room provisioning example described above, which may be applicable here, no attestation is needed.

Upon receiving the attestation statement, the TPH 150 may verify the attestation statement (or, in case clean room provisioning example above, look up the requestor's key based on their identity), at operation 510. At this point in process 500, the requestor 120 knows which key to use to address the outer TrEE. In some aspects, an indication that the key obtained from the attestation statement or request is an encryption key of the outer TrEE or secure kernel (and not the inner trustlet) may be included with the request or the attestation statement, or communicated in another way or out of band to the TPH 150, set as the default procedure, etc. Next, at operation 511, the TPH 50 may obtain the protected data indicated in the request, for example from a KMS 115 or from any other entity holding the protected data, such as one or more services holding license, password, permission, and/or other information.

The TPH 150 may determine which trustlet type to target, for example, based on the request or based on the TPH 150 itself (e.g., each TPH 150 may be designed specifically for a certain purpose or application, such as NetFlix), at operation 512. In the example utilizing a KP, such as described in reference to FIG. 1C above, the trustlet type may be encoded in the KP. In some other examples, the trustlet type may be set by default or hard-coded, such as in implementations utilizing HGS 150*a*. In the HGS example, the HGS 150*a* may always target a virtual mode secure process (VMSP) trustlet, the type of which may be hard-coded (as the KP may not contain that information).

Upon determining the trustlet type to target, the TPH 150 may construct a message including the protected data to send to the TrEE, at operation 514. A more detailed example of operation 514 is depicted in FIG. 5B.

In some aspects, operation 514 may further include operation 536, in which the TPH 150 generates two random symmetric keys: a transfer key TX and a wrapping key TW. Next, the TPH 150 may encrypt the TX using the public key in the THC (which is part of the attestation statement), at operation 538 (e.g., assuming that the THC is based on an encryption key, not a signing key). In some aspects, operation 538 may include encrypting TX with the host's IDK using RSA encryption and OAEP padding. In some aspects, the TPH 150 may verify the session ID of the trustlet at operation 540, for example, to verify that the trustlet is authorized or has the correct permission to access the protected data (e.g., paid for an online service or content item). In some cases, the session ID may include the trustlet type; however, in other cases, the trustlet type may be encoded in the KP or even hard-coded. The TPH 150 may then encrypt the TW using TX, and the trustlet type and session ID of the trustlet may be concatenated and used as an "authentication tag," at operations 542 and 544. Note that the use of an authentication tag is an artifact of the AES-GCM protocol; other cryptographic protocols may use a different scheme with the same effect. The idea behind the authentication tag is to bind together the TW with the trustlet type and the session ID in a way that they cannot be decoupled by an attacker in transit. There are multiple other ways of achieving this cryptographically; AES-GCM is described herein because it provides this functionality natively, and is therefore advantageous.

The TPH 150 may then send the encrypted TX and authenticated encryption of TW to the requestor 120 at operation 546. Returning to FIG. 5A, after receiving message 516, which may be generated via the operations of FIG. 5B and/or may include protected data encrypted in a similar way as TW, the requestor 120 may forward the message to the trustlet, at operation 518. As the trustlet is unable to decipher the message (it's trying to get at TW), the trustlet may pass the message to the secure kernel, at operation 520. Alternatively the requestor 120 could send the response to the secure kernel, bypassing the trustlet, and the secure kernel would alert the trustlet with new information when it decrypts the TW.

Next, at operation 522, the secure kernel may decrypt the TX using its private encryption key, and then decrypt the TW using the TX, using the authentication tag to ensure that the correct trustlet type, with the correct session ID, is requesting that the message be decrypted. If the authentication tag is verified, the secure kernel may return the TW to the trustlet, at operation 524. The trustlet may then use the received TW to decrypt whatever else TW is encrypting, such as the protected data, which may be of any size.

In some aspects, the secure kernel may implement one or more processes, such as defined by one or more API's, for receiving, decrypting, and passing targeted messaged to the correct trustlet. The API may receive the encrypted message targeted at a particular trustlet and decrypt the TX using the private portion of the IDK (secure kernel identify encryption key). The API may construct its own authentication tag using concatenation of trustlet type and session ID of the calling trustlet as the tag (cannot use supplied authentication tag for obvious security reasons). The trustlet type and the session ID may then be obtained. If authentication is successful, the API may then decrypt TW using TX. If decryption succeeds, the API may then return TW to the trustlet.

In one example, the message received may include the following information: a version number (e.g., 0); a transfer key encryption protocol ID (e.g., RSA 2048); a transfer key encryption padding ID (e.g., OAEP); a wrapping key encryption protocol ID (e.g., AES-GCM); the length of transfer key ciphertext; the length of wrapping key authentication tag (ignored); the length of wrapping key ciphertext; and the transfer key ciphertext, wrapping key authentication tag (ignored) and wrapping key ciphertext. It should be appreciated that this is only one way among many in which the message may be constructed.

Figure 6:
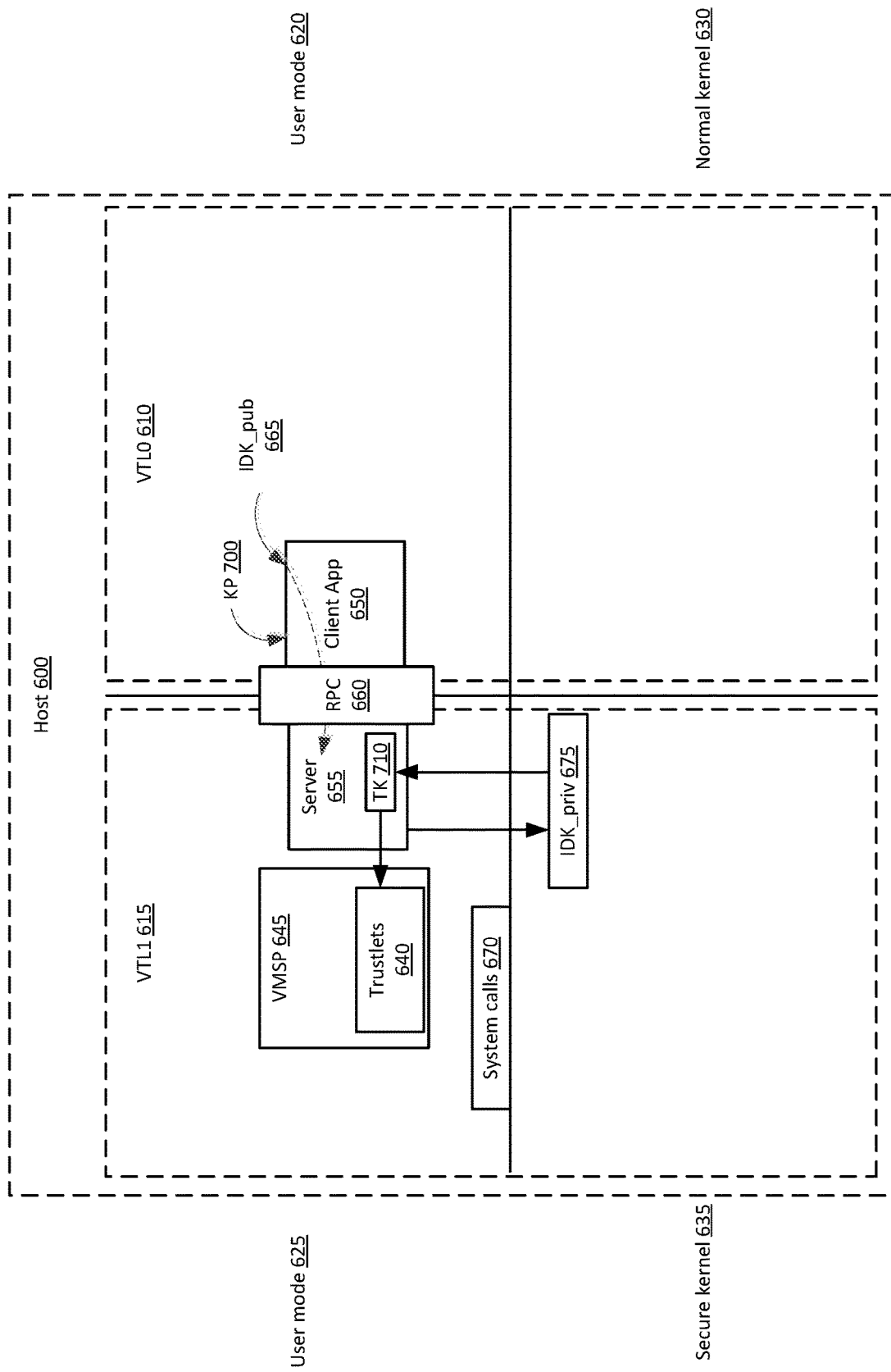
FIG. 6 illustrates an example system in which one or more of the described processes may be implemented.

In some aspects, one or more of the above described systems or processes 100, 300, 400, or 500 process/system 100 may be implemented in resources or a virtual machine implementing Virtual Secure Mode (VSM). VSM and related concepts, in the context of virtual machines, are described in U.S. patent application Ser. No. 14/186,415, titled "Virtual Secure Mode for Virtual Machines," filed Feb. 21, 2014, the contents of which are herein incorporated by reference in their entirety. FIG. 6 illustrates a system or host operating system 600 including a VSM computing environment divided into different virtual trust levels, VTL0 610 and VTL1 615. System 600 may be a more specific implementation of one or more aspects of systems 100*a*, 100*b*, or 100*c*, such as cloud host 180, including a computing environment operating in VSM. VTL0 610 may include a user mode 620 and a normal kernel mode 630, and VTL1 615 may include a user mode 625 and a secure kernel mode 635. The different VTL's may be provided by a hypervisor, for example, running on top of physical computing components or virtual computing resources (e.g., one or more virtual machines), which interacts and defines VTL0 610 and VTL1 615 via restrictions on access to memory for certain processes and the like. In the illustrated example, VTL1 615 may be more secure than VTL0 610, such that a higher access is required to read and/or write data or code associated with VTL1. VTL0 610 may correspond to requestor 120, whereas VTL1 615 may correspond to TrEE 140. System 600 is described below as utilizing a KP 700. However, it should be appreciated that this is only given by way of example; system 600 may utilize the attestation/authentication schemes described above without the use of a KP to a similar effect.

As described in reference to system 600, client app 650/VTL0 610 of host 600 may correspond to requestor 120, whereas VTL1 615, and more specifically the secure kernel 635 of VTL1 615 may correspond to TrEE 140. In some aspects, trustlets 640 may correspond to the nested trustlet described in reference to process 500. In some aspects, system 600 may implement process 500 described above. In other instances, system 600 may implement process 800 and/or 900 described below in reference to FIGS. 8 and 9, with the primary difference between processes 500 and 800 being the use of a KP to initialize a trustlet and the use of the specific implementation of an HGS 150a in place of a more generic TPH 150.

Figure 7:
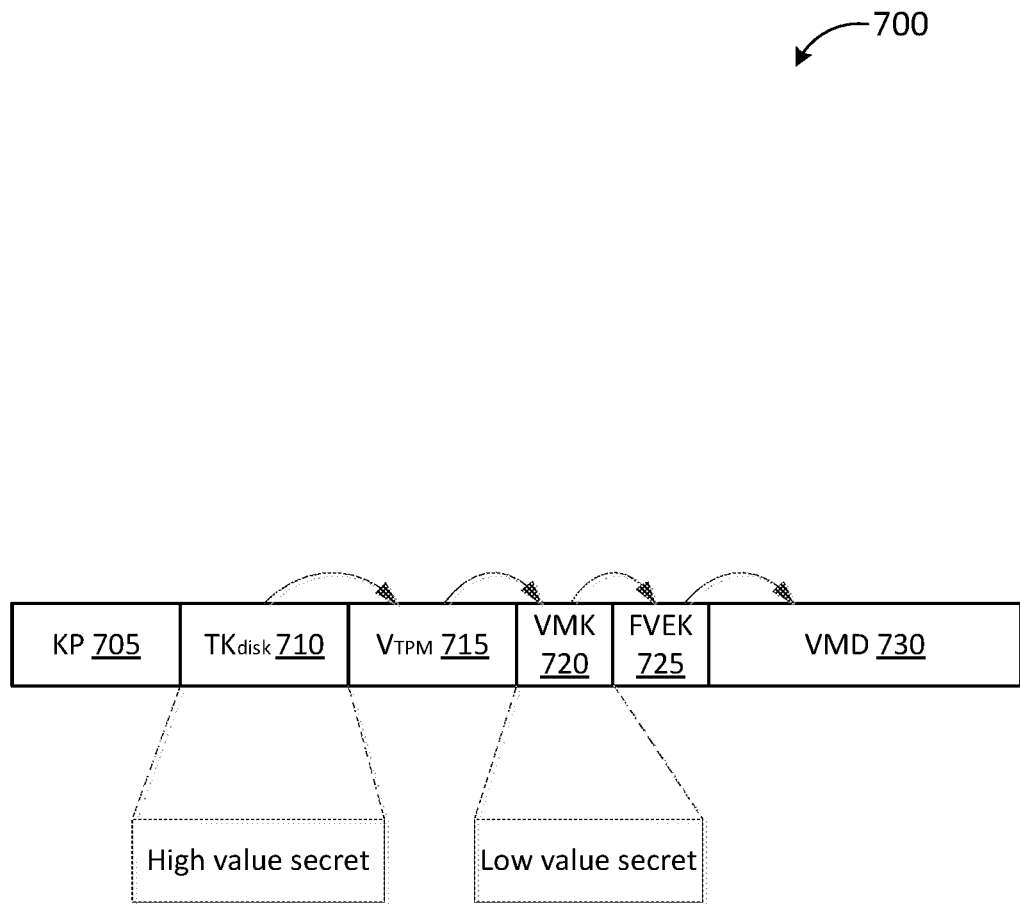
FIG. 7 depicts an example of a data structure used to deliver a transport key and/or protected data securely to a TrEE.

As illustrated, one or more TrEE's or trustlets 640 may reside in the user mode 625 of VTL1 615. In some aspects, the one or more trustlets 640 may be accessed or associated with a Virtual Machine Secure Process (VMSP) 645. A client operation, application, program, etc., 650 (client) may be operating in the user mode 620 of VTL0 610. A server 655 residing in the user mode 625 of VTL1 615 may communicate with client 650 via RPCs 660. As illustrated, client 650 may request initiation of trustlet 640 to perform one or more secure operations, for example, utilizing VMSP 645, via one or more RPCs 660. In other aspects, the server 655 may initiate the trustlet 640 without receiving an explicit request from client 650. In either case, the server 655 may initiate trustlet(s) 640, with a specific trustlet type identifying the parameters of the trustlet and a session ID identifying the particular instance of the trustlet 640. In some aspects, the trustlet type may be initialized via a data structure including a KP 405, such as described above in system 100c in reference to FIG. 1C. An example data structure including a KP, such as KP 700 is illustrated in FIG. 7.

The data structure 700 may include a key protector (KP) 705, which is the cryptographic wrapping of an encryption key (here the transport key TK), as described in U.S. patent application Ser. No. 14/481,399 titled "Secure Transport of Encrypted Virtual Machines with Continuous Owner Access," filed Sep. 9, 2014, the contents of which are herein incorporated by reference in its entirety. The KP 705 ensures that access to the TK 710 and/or other protected data is only given to authorized entities. The TK 710, which is the key to be delivered to the TrEE 140, may be wrapped by KP 705, or in some cases a wrapping key or TW. The TK 710 may be considered a high value secret. In some cases, the TK 710 may be decrypted at KMS 115.

The data structure 700 may also include virtual machine data (VMD) 730, which may include data to initialize a trustlet. The VMD 730 may be encrypted using an appropriate encryption technology, such as BitLocker available from Microsoft Corporation of Redmond Wash. The full volume encryption key (FVEK) 725, which may be used to decrypt the VMD 730, and may be protected by a virtual trusted platform module ($V_{TPM}$), the state of which (725) is encrypted and stored as part of the metadata, alongside the KP 705. In some aspects, the FVEK 725 may be encrypted by the volume master key (VMK) 720. The $V_{TPM}$ state 725 is itself encrypted using a key wrapped by the KP 705. In some aspects, the $V_{TPM}$ state 725 may be encrypted by TK 710 (high-value secret) and "seal" data to PCR values (e.g., PCR7) such that if a PCR value is in an expected state, the TPM will allow access to, e.g., decrypt, key material. In this case, the TPM protector is a data structure that is fed into the TPM to unseal some secret if one or more PCRs are in expected states. In other cases, non-TPM protectors may be used as well.

The Volume Master Key (VMK) 720 may be unsealed by the $V_{TPM}$ state 725. The $V_{TPM}$ state 725 may be encrypted by the TK 710 inside the KP 705. In some cases, VMK 720 may be a Bitlocker Volume Master Key, and may be marked as a low value secret.

Each field or block of the KP 700 may also be described in terms of what it encrypts, such as Encrypt(key, data) shorthand:

| | |
|---|---|
| $VMD_{DISK}$ | Encrypt(FVEK, ClearText disk data) |
| $FVEK_{DISK}$ | Encrypt(VMK, FVEK) |
| $VMK_{DISK}$ | Encrypt(VMK) |
| $V_{TPM DISK}$ | Encrypt(TK, VTPM) |
| $TK_{DISK}$ | Encrypt(KP, TK) |
| KP | The KP is associated with the VM and the trustlet actually never gets to see it. KP goes to KMS, which decrypts it and returns the TK to the trustlet (via the targeting mechanism described above). TK decrypts the vTPM, vTPM unseals the VMK, yielding the FVEK. |

In one example, KP 405, $V_{TPM}$ state 415, VMK 420, and VMD 430 may be the data stored on the disk. The $V_{TPM}$ state 415 may be initialized when the $V_{TPM}$ is created, and may be ensured to be unique. For runtime uniqueness, e.g. of generated secrets or protected data, $V_{TPM}$ relies on security of RNG offered to it by the secure kernel. After the trustlet decrypts the $V_{TPM}$ state 415 using the decrypted TK 710, the remaining operations to access the VMD 730 may be the same or similar to operations performed between a physical machine and a physical TPM. These operations may include the $V_{TPM}$ performing measurements of the VSM, using the $V_{TPM}$ measurements to unseal the VMK (resulting in providing the FVEK 725 to the operating system loader), and the operating system using the FVEK 725 to decrypt the VMD 730.

To launch a trustlet, client 650 may request and/or receive data structure 700. Client 650 may send the KP 705 or the entire data structure 700 to TPH 150 (or in some implementations HGS 150a), which may communicate with a KMS 115 to decrypt the TK 710. The TPH may then target the TK 710 at the secure kernel 635 associated with trustlet 640, for example via process 800 described below, utilizing IDK_pub 665. The secure kernel 635 may obtain the IDK_pub and IDK_pri at launch time. The secure kernel 635 may use its private key 675 (e.g., IDK_pri) to decrypt and return the TK 710 to the server 655. The server 655 may then deliver the TK 710 to the trustlet 640. In some cases, the secure kernel 635 may return the TK 710 directly to the trustlet 640. In some aspects, protected data may be delivered to trustlet 640 with the TK 710, and be encrypted by the TK 710. In this way, the trustlet 640 may decrypt the protected data using the TK 710.

Figure 8:
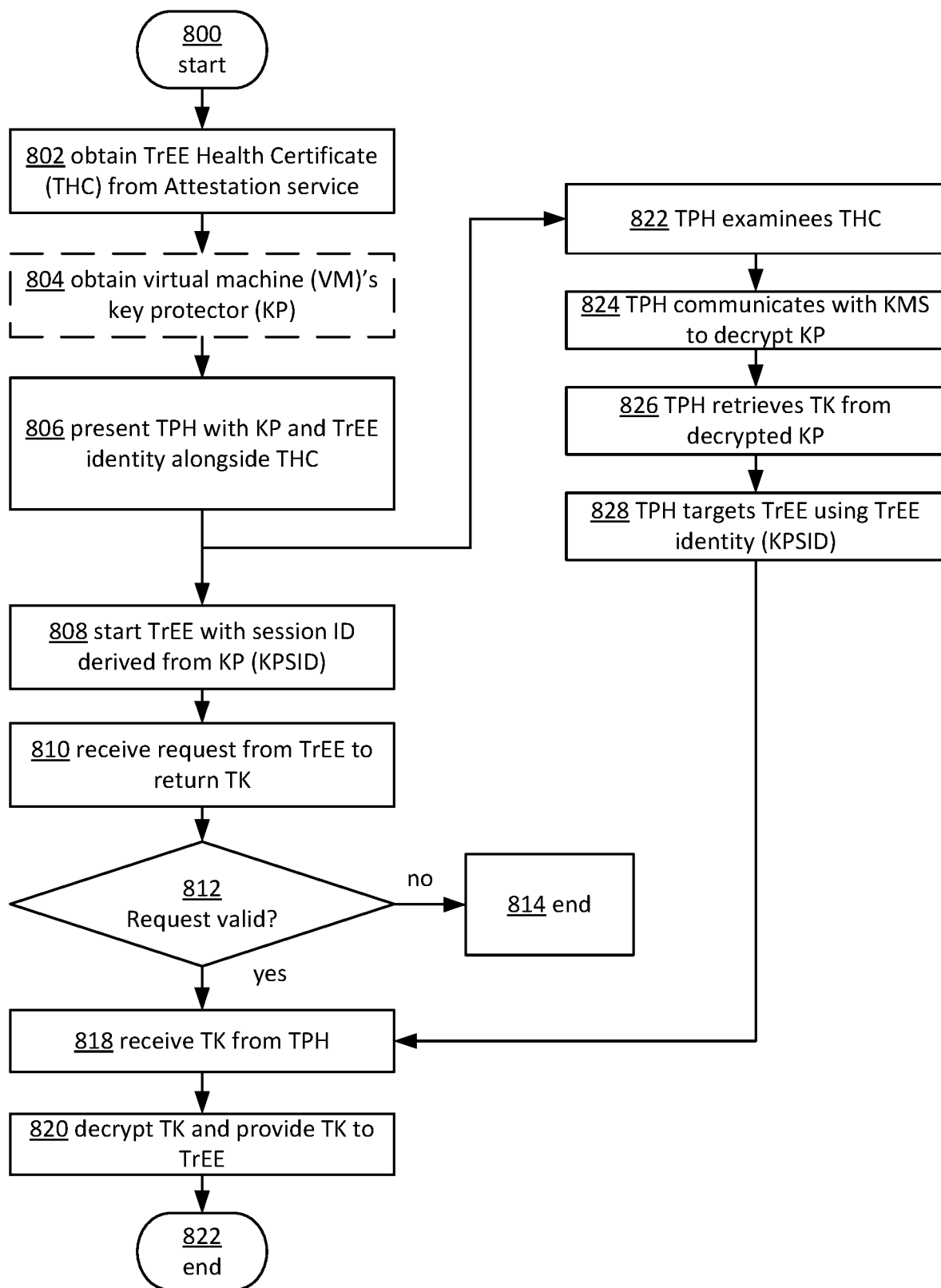
FIG. 8 depicts another example process for delivering protected data to a nested TrEE utilizing an intermediary targeting protocol head based around an encryption key of the outer TrEE.

FIG. 8 illustrates an example process 800 for targeting a transport key and/or protected data encrypted by the transport key to a TrEE or a specific trustlet, using an identity key of the TrEE or trustlet. More specifically, process 800 illustrates a way of targeting a trustlet via the encryption key of the trustlet's secure kernel.

The cloud fabric host or host OS (e.g., Host OS 600) performs a series of steps in order to receive the transport key. The cloud fabric host may first obtain a TrEE Health Certificate (THC), for example built around the encryption identity key (IDK_E) of the secure kernel associated with the TrEE or trustlet, at operation 602, such as according to the process described in reference to FIG. 4B above. In one aspect, operation 602 may include creating, by the host an attestation log (TCG log) at boot which contains the public version of IDK_E, the private portion of which lives in the VSM Secure Kernel (SK) associated with the trustlet. The attestation log may be presented to the Attestation Service (AS). The AS may inspect the attestation log and issue a THC to the host, built around IDK_E (e.g., the public portion of the asymmetric key). In some aspects, similar to IDK_E, a "Signing Identity Key" (IDK_S) may also be created and can have a separate THC built around it, as will be described in greater detail below in reference to FIG. 9.

A solution to the key delivery problem can be built using either IDK_E or IDK_S, as described below.

When time comes to load a new shielded VM, the host obtains the VM's KP, at operation 804, and initiates a conversation with the TPH (e.g., TPH 150), the goal of which is to inject the TK encrypted by the KP into the VMSP trustlet.

In order to exchange the KP for the TK, the host may present the TPH, such as TPH 150, with the KP and "trustlet identity" alongside the THC, at operation 806. The cloud fabric host may also start a trustlet or TrEE with the "session ID" derived from the KP (KPSID), at operation 808. In some aspects, the received KP will form the basis of a session ID value by creating a SHA-2 hash over it or utilizing other one way functions. The TPH may examine the THC at operation 822, and communicate with a KMS, such as KMS 115, or other entity in possession or which has access to protected data and/or the decryption key for the KP, to decrypt the KP to access the TK, at operation 824. At operations 826, the TPH may use a special cryptographic construction to target the trustlet with the computed KPSID, for example, as described above in reference to process 500.

The requestor or client 650 may receive the response from the TPH, and forward it to the trustlet with the given KPSID. The trustlet or server may ask the VSM secure kernel to decrypt the response and return to it the TK, at operation 810. The secure kernel examines the response, validates that it is targeted at the trustlet type and session ID of the trustlet at operation 812, and only returns the key if there is a match, at operation 818. This way, if the TPH response ends up in the wrong hands, is cryptographically impossible to make sense of. Upon receiving the key, the host may decrypt the key and provide it to the TrEE, at operation 820, at which point, process 800 may end.

Figure 9:
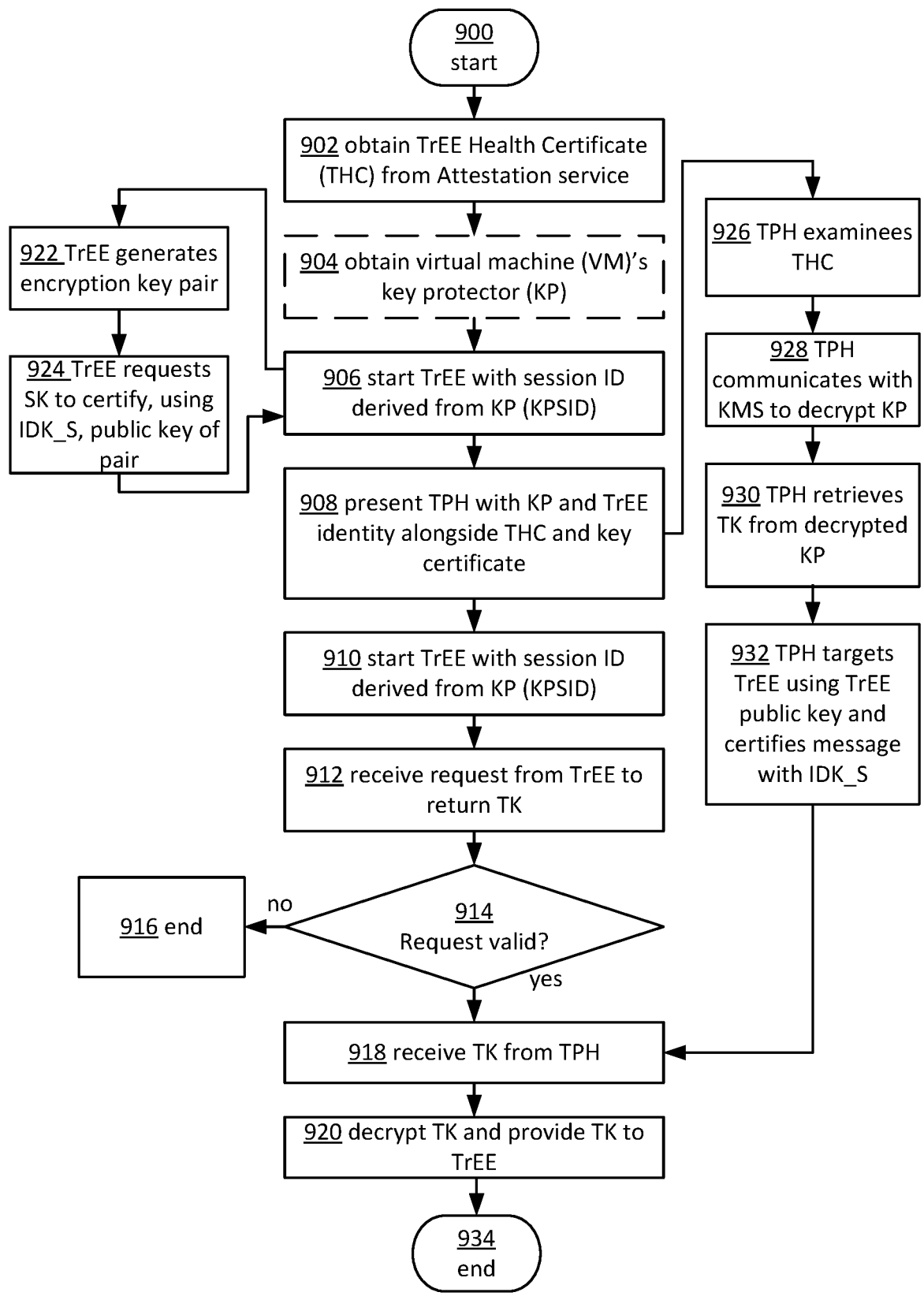
FIG. 9 depicts another example process for delivering protected data to a nested TrEE utilizing an intermediary targeting protocol head based around an encryption key of the inner TrEE.

FIG. 9 illustrates another example process 900 for targeting a transport key and/or protected data encrypted by the transport key into a trustlet, using a signing key of the secure kernel. More specifically, process 900 illustrates a way of targeting a trustlet via the encryption key of the trustlet certified by the signing key of the secure kernel.

Process 800 illustrated how a response can be targeted at a trustlet indirectly through the identity encryption key shared between all trustlets. However, if the TrEE has an attestable identity signing key, another approach may also be used. Here, each trustlet can generate its own encryption key pair and have the secure kernel certify, using IDK_S, the public key part of the pair. Note that such certification must also cryptographically bind the key to the trustlet type and session ID of the trustlet:

Key certification=σIDK_S(Trustlet_Encryption_Key_Pub, Trustlet_Type, Session_ID)

where σ IDK_S denotes a concatenation of its inputs ( ) followed by a signature over these inputs using the given key.

In this case, the requestor presents to the TPH the trustlet's key alongside the THC and the key certification and the TPH responds by encrypting the transport key to the trustlet's encryption key, as differentiated from process 800 at operations 822 and 824.

In some aspects, a "security version number" (SVN) may also be used or indicated in the key certification to prevent other types of attacks to ensure the TrEE is not an older, and potentially vulnerable version. In some cases, when the secure kernel is attested but the inner trustlet is not (e.g., the trustlet is demand loaded after attestation is already done), then including the SVN of the trustlet can instruct the TPH 150 to refuse targeting older, vulnerable trustlets even if the THC is okay.

One difference between the two approaches of processes 800 and 900 is who enforces the binding between the trustlet or TrEE ID, the session ID and the transport key: in process 800 it is the secure kernel, and in process 900, it is the TPH 150. Another primary difference is in how the response is structured cryptographically. In the prior case, it is targeted at the secure kernel which in turn decides which trustlet is allowed to see it, and in this case, the response is targeted at the trustlet directly, with the trustlet's key certified by the secure kernel's key.

In some aspects, the above-described techniques may be implemented to provide full credential isolation for containers. The fundamental problem is the same, such that the container may request credentials from its host. The host may then request the credential on the container's behalf from some KMS. If the requested credential comes back unencrypted to the host (e.g., the credentials arrive on demand, and are not part of a container image), it will result it "late credential binding." This binding is valuable but does not amount to credential isolation, such that if the host is compromised, the credentials are disclosed.

Figure 10:
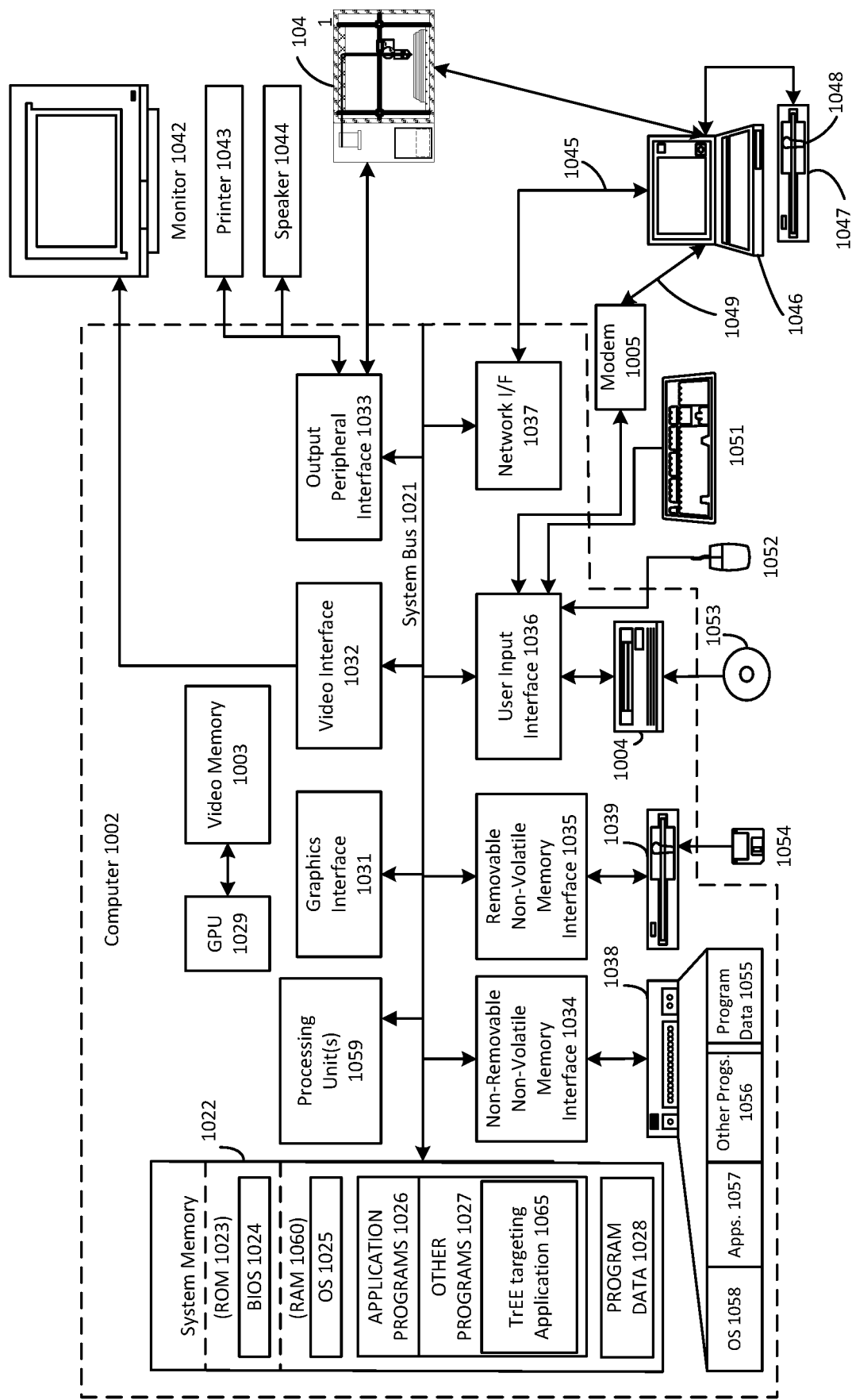
FIG. 10 depicts an example general purpose computing environment in which the techniques described herein may be embodied.

The techniques described above may be implemented on one or more computing devices or environments, as described below. FIG. 10 depicts an example general purpose computing environment, for example, that may embody one or more of requestor 120, TrEE 140, TPH 150, Host OS 600, AS 424, KMS 115, in which some of the techniques described herein may be embodied. The computing system environment 1002 is only one example of a suitable computing environment and is not intended to suggest any limitation as to the scope of use or functionality of the presently disclosed subject matter. Neither should the computing environment 1002 be interpreted as having any dependency or requirement relating to any one or combination of components illustrated in the example operating environment 1002. In some embodiments the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 1002, which may include any of a mobile device or smart phone, tablet, laptop, desktop computer, or collection of networked devices, cloud computing resources, etc., typically includes a variety of computer-readable media. Computer-readable media can be any available media that can be accessed by computer 1002 and includes both volatile and nonvolatile media, removable and non-removable media. The system memory 1022 includes computer-readable storage media in the form of volatile and/or nonvolatile memory such as read only memory (ROM) 1023 and random access memory (RAM) 1060. A basic input/output system 1024 (BIOS), containing the basic routines that help to transfer information between elements within computer 1002, such as during start-up, is typically stored in ROM 1023. RAM 1060 typically contains data and/or program modules that are immediately accessible to and/or presently being operated on by processing unit 1059. By way of example, and not limitation, FIG. 10 illustrates operating system 1025, application programs 1026, other program modules 1027 including a TrEE targeting application 1065, and program data 1028.

The computer 1002 may also include other removable/non-removable, volatile/nonvolatile computer storage media. By way of example only, FIG. 10 illustrates a hard disk drive 1038 that reads from or writes to non-removable, nonvolatile magnetic media, a magnetic disk drive 1039 that reads from or writes to a removable, nonvolatile magnetic disk 1054, and an optical disk drive 1004 that reads from or writes to a removable, nonvolatile optical disk 1053 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 1038 is typically connected to the system bus 1021 through a non-removable memory interface such as interface 1034, and magnetic disk drive 1039 and optical disk drive 1004 are typically connected to the system bus 1021 by a removable memory interface, such as interface 1035 or 1036.

The drives and their associated computer storage media discussed above and illustrated in FIG. 10, provide storage of computer-readable instructions, data structures, program modules and other data for the computer 1002. In FIG. 10, for example, hard disk drive 1038 is illustrated as storing operating system 1058, application programs 1057, other program modules 1056, and program data 1055. Note that these components can either be the same as or different from operating system 1025, application programs 1026, other program modules 1027, and program data 1028. Operating system 1058, application programs 1057, other program modules 1056, and program data 1055 are given different numbers here to illustrate that, at a minimum, they are different copies. A user may enter commands and information into the computer 1002 through input devices such as a keyboard 1051 and pointing device 1052, commonly referred to as a mouse, trackball or touch pad. Other input devices (not shown) may include a microphone, joystick, game pad, satellite dish, scanner, retinal scanner, or the like. These and other input devices are often connected to the processing unit 1059 through a user input interface 1036 that is coupled to the system bus 1021, but may be connected by other interface and bus structures, such as a parallel port, game port or a universal serial bus (USB). A monitor 1042 or other type of display device is also connected to the system bus 1021 via an interface, such as a video interface 1032. In addition to the monitor, computers may also include other peripheral output devices such as speakers 1044 and printer 1043, which may be connected through an output peripheral interface 1033.

The computer 1002 may operate in a networked environment using logical connections to one or more remote computers, such as a remote computer 1046. The remote computer 1046 may be a personal computer, a server, a router, a network PC, a peer device or other common network node, and typically includes many or all of the elements described above relative to the computer 1002, although only a memory storage device 1047 has been illustrated in FIG. 10. The logical connections depicted in FIG. 10 include a local area network (LAN) 1045 and a wide area network (WAN) 1049, but may also include other networks. Such networking environments are commonplace in offices, enterprise-wide computer networks, intranets, the Internet, and cloud computing resources.

When used in a LAN networking environment, the computer 1002 is connected to the LAN 1045 through a network interface or adapter 1037. When used in a WAN networking environment, the computer 1002 typically includes a modem 1005 or other means for establishing communications over the WAN 1049, such as the Internet. The modem 1005, which may be internal or external, may be connected to the system bus 1021 via the user input interface 1036, or other appropriate mechanism. In a networked environment, program modules depicted relative to the computer 1002, or portions thereof, may be stored in the remote memory storage device. By way of example, and not limitation, FIG. 10 illustrates remote application programs 1048 as residing on memory device 1047. It will be appreciated that the network connections shown are example and other means of establishing a communications link between the computers may be used.

In some aspects, other programs 1027 may include a TrEE targeting component or application 1065 that includes the functionality as described above. In some cases, TrEE targeting application 1065, may execute some or all operations of processes 300, 400, 500, 800 and/or 900.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage. The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. For purposes of this specification and the claims, the phrase "computer-readable storage medium" and variations thereof, does not include waves, signals, and/or other transitory and/or intangible communication media. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system, comprising:
   a processor; and
   a memory communicatively coupled to the processor, storing instructions that when executed by the processor, cause the computing system to perform the following operations:
   registering a public encryption key of a trusted execution environment (TrEE) that corresponds to a private encryption key held by the TrEE, the TrEE comprising a trustlet, the public encryption key comprising a trustlet public encryption key that corresponds to a trustlet private encryption key held by the trustlet;
   receiving a key certification statement that binds the trustlet public encryption key and a trustlet ID;
   receiving a request for protected data from a requestor associated with the TrEE;
   looking up the public encryption key to be used in delivering a response to the request for the protected data based on receipt of the request for the protected data and further based on the registered public encryption key of the TrEE and an identity of the requestor that requests the protected data;
   generating targeted protected data by encrypting the protected data with the public encryption key that is looked up based on the registered public encryption key of the TrEE and the identity of the requestor that requests the protected data; and
   sending the targeted protected data to the requestor.

2. The computing system of claim 1, wherein the instructions, when executed by the processor, cause the computing system to associate an identity of the requestor with the public encryption key of the TrEE.

3. The computing system of claim 1, wherein the trustlet is configured to run on top of a secure kernel.

4. The computing system of claim 3, wherein the public encryption key of the TrEE comprises an encryption key associated with the secure kernel.

5. The computing system of claim 4, wherein the encryption key is further associated with a session ID and a trustlet type, and wherein the instructions, when executed by the processor, cause the computing system to:
   encrypt a transfer encryption key with the public encryption key of the TrEE;
   encrypt the protected data with the transfer encryption key and an authentication tag, wherein the authentication tag binds the requestor with the session ID and the trustlet type; and
   send the encrypted transfer encryption key, the encrypted protected data, and encrypted authentication tag to the requestor.

6. The computing system of claim 3, wherein the key certification statement is generated using a signing key by the secure kernel, and wherein the signing key certifies the trustlet public encryption key of a public key private key pair generated by the trustlet.

7. The computing system of claim 3, wherein the trustlet ID comprises a session ID and a trustlet type, wherein the key certification statement is generated using a signing key by the secure kernel, and binds the trustlet public key, the trustlet type, and the session ID.

8. The computing system of claim 1, wherein the instructions, when executed by the processor, cause the computing system to:
compare the trustlet ID to a list of authorized trustlet IDs; and
encrypt the protected data with the trustlet public encryption key only if the trustlet ID is associated with the list of authorized trustlet IDs.

9. A method for delivering protected data to a trusted execution environment (TrEE) associated with an untrusted requestor, the method comprising:
registering, by a targeting protocol head, a public encryption key of a TrEE that corresponds to a private encryption key held by the TrEE, the TrEE comprising a trustlet, the public encryption key comprising a trustlet public encryption key that corresponds to a trustlet private encryption key held by the trustlet;
receiving, by the targeting protocol head, a key certification statement that binds the trustlet public encryption key and a trustlet ID;
receiving, by the targeting protocol head, a request for protected data from a requestor associated with the TrEE;
looking up the public encryption key to be used in delivering a response to the request for the protected data based on receipt of the request for the protected data and further based on the registered public encryption key of the TrEE and an identity of the requestor that requests the protected data;
generating targeted protected data by encrypting the protected data with the public encryption key that is looked up based on the registered public encryption key of the TrEE and the identity of the requestor that requests the protected data; and
sending the targeted protected data to the requestor.

10. The method of claim 9, wherein registering the public encryption key of the TrEE further comprises associating an identity of the requestor with the public encryption key of the TrEE.

11. The method of claim 9, further comprising:
obtaining the protected data from a key management system.

12. The method of claim 9, wherein the trustlet runs on top of a secure kernel.

13. The method of claim 12, wherein the public encryption key of the TrEE comprises an encryption key associated with the secure kernel.

14. The method of claim 13, wherein the encryption key is further associated with a session ID and a trustlet type.

15. The method of claim 14, wherein generating the targeted protected data by encrypting the protected data with the public encryption key of the TrEE comprises:
encrypting a transfer encryption key with the public encryption key of the TrEE; and
encrypting the protected data with the transfer encryption key and an authentication tag, wherein the authentication tag binds the requestor with the trustlet ID; and
wherein sending the targeted protected data to the requestor further comprises:
sending the encrypted transfer encryption key, the encrypted protected data, and encrypted authentication tag to the requestor.

16. The method of claim 12, wherein the key certification statement is generated using a signing key by the secure kernel, and wherein the signing key certifies the trustlet public encryption key of a public key private key pair generated by the trustlet.

17. The method of claim 12, wherein the trustlet ID comprises a session ID and a trustlet type, wherein the key certification statement is generated using a signing key by the secure kernel, and binds the trustlet public key, the trustlet type, and the session ID.

18. The method of claim 9, further comprising:
comparing, by the targeting protocol head, the trustlet ID to a list of authorized trustlet IDs; and
encrypting, by the targeting protocol head, the protected data with the trustlet public encryption key only if the trustlet ID is associated with the list of authorized trustlet IDs.

19. The method of claim 9, further comprising:
receiving, at the trustlet, the encrypted protected data from the requestor; and
decrypting, by the trustlet, the encrypted protected data using the trustlet private encryption key.

20. A computer readable storage device comprising instructions for enabling a processor-based system to perform operations to deliver protected data to a trusted execution environment (TrEE) associated with a potentially untrusted requestor, the operations comprising:
register a symmetric encryption key of a TrEE, the TrEE comprising a trustlet, the symmetric encryption key comprising a symmetric trustlet encryption key of the trustlet;
receive a key certification statement that binds the symmetric trustlet encryption key and a trustlet ID;
receive a request for protected data from a requestor associated with the TrEE;
look up the symmetric encryption key to be used in delivering a response to the request for the protected data based on receipt of the request for the protected data and further based on the registered symmetric encryption key of the TrEE and an identity of the requestor that requests the protected data;
generate targeted protected data by encrypting the protected data with the symmetric encryption key that is looked up based on the registered symmetric encryption key of the TrEE and the identity of the requestor that requests the protected data; and
send the targeted protected data to the requestor.

* * * * *